US010662824B2

United States Patent
Noureldin et al.

(10) Patent No.: US 10,662,824 B2
(45) Date of Patent: *May 26, 2020

(54) NATURAL GAS LIQUID FRACTIONATION PLANT WASTE HEAT CONVERSION TO POWER USING ORGANIC RANKINE CYCLE

(71) Applicant: Saudi Arabian Oil Company, Dhahran (SA)

(72) Inventors: Mahmoud Bahy Mahmoud Noureldin, Dhahran (SA); Akram Hamed Mohamed Kamel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,341

(22) Filed: Dec. 14, 2017

(65) Prior Publication Data

US 2019/0048756 A1    Feb. 14, 2019

Related U.S. Application Data

(60) Provisional application No. 62/542,687, filed on Aug. 8, 2017.

(51) Int. Cl.
    *F01K 27/02*  (2006.01)
    *C10G 7/00*   (2006.01)
    (Continued)

(52) U.S. Cl.
    CPC ............ *F01K 27/02* (2013.01); *B01D 1/0058* (2013.01); *B01D 1/26* (2013.01); *B01D 3/065* (2013.01);
    (Continued)

(58) Field of Classification Search
    CPC .. F01K 27/02; C10G 5/06; C10G 7/00; C02F 1/04; C02F 1/16; F25J 3/0209;
    (Continued)

(56) References Cited

U.S. PATENT DOCUMENTS

| 4,907,410 A | 3/1990 | Chang |
| 2,685,152 A | 11/1997 | Sterling |

(Continued)

FOREIGN PATENT DOCUMENTS

| WO | 2006039182 | 4/2006 |
| WO | 2012003525 | 1/2012 |

(Continued)

OTHER PUBLICATIONS

M. Mehrpooya et al., "Introducing a novel integrated NGL recovery process configuration (with a self-refrigeration system (open-closed cycle)) with minimum energy requirement," Chemical Engineering and Processing: Process Intensification, Apr. 2010, vol. 49, No. 4, pp. 376-388.

(Continued)

*Primary Examiner* — Brian A McCaig
(74) *Attorney, Agent, or Firm* — Fish & Richardson P.C.

(57) ABSTRACT

Certain aspects of a natural gas liquid fractionation plant waste heat conversion to power using Organic Rankine Cycle can be implemented as a system. The system includes a heating fluid circuit thermally coupled to multiple heat sources of a natural gas liquid (NGL) fractionation plant. The system includes a power generation system that includes an organic Rankine cycle (ORC), which includes (i) a working fluid that is thermally coupled to the heating fluid circuit to heat the working fluid, and (ii) an expander configured to generate electrical power from the heated working fluid. The system includes a control system configured to actuate a set of control valves to selectively (Continued)

thermally couple the heating fluid circuit to at least a portion of the multiple heat sources of the NGL fractionation plant.

26 Claims, 15 Drawing Sheets

(51) Int. Cl.

| | |
|---|---|
| *B01D 1/26* | (2006.01) |
| *B01D 3/06* | (2006.01) |
| *B01D 3/14* | (2006.01) |
| *C10G 5/06* | (2006.01) |
| *F25J 3/02* | (2006.01) |
| *C02F 1/04* | (2006.01) |
| *B01D 1/00* | (2006.01) |
| *C02F 1/16* | (2006.01) |
| *F25B 27/02* | (2006.01) |
| *F28D 21/00* | (2006.01) |
| *F01K 25/10* | (2006.01) |
| *B01D 53/00* | (2006.01) |
| *B01D 53/14* | (2006.01) |
| *B01D 53/26* | (2006.01) |
| *C02F 103/08* | (2006.01) |

(52) U.S. Cl.
CPC ............ *B01D 3/146* (2013.01); *C02F 1/04* (2013.01); *C02F 1/16* (2013.01); *C10G 5/06* (2013.01); *C10G 7/00* (2013.01); *F25B 27/02* (2013.01); *F25J 3/0209* (2013.01); *F25J 3/0233* (2013.01); *F25J 3/0238* (2013.01); *F25J 3/0242* (2013.01); *F28D 21/001* (2013.01); *B01D 53/002* (2013.01); *B01D 53/1456* (2013.01); *B01D 53/263* (2013.01); *C02F 2103/08* (2013.01); *F01K 25/10* (2013.01); *F25J 2200/02* (2013.01); *F25J 2200/70* (2013.01); *F25J 2200/74* (2013.01); *F25J 2215/62* (2013.01); *F25J 2240/70* (2013.01); *F25J 2260/02* (2013.01); *F25J 2270/12* (2013.01); *F25J 2270/60* (2013.01); *F28D 2021/0019* (2013.01)

(58) Field of Classification Search
CPC ........ F25J 3/0233; F25J 3/0238; F25J 3/0242; B01D 3/065; B01D 3/146; B01D 1/0058; B01D 1/26
See application file for complete search history.

(56) References Cited

U.S. PATENT DOCUMENTS

| | | | |
|---|---|---|---|
| 7,257,966 B2 | 8/2007 | Lee et al. | |
| 7,458,231 B1 | 12/2008 | Vanden | |
| 8,776,703 B2* | 7/2014 | Hall | D05C 15/26 112/80.23 |
| 9,598,993 B2 | 3/2017 | Younes et al. | |
| 9,657,937 B2 | 5/2017 | Niass | |
| 9,745,871 B2 | 8/2017 | Noureldin et al. | |
| 9,828,885 B2 | 11/2017 | Noureldin et al. | |
| 9,851,153 B2 | 12/2017 | Noureldin et al. | |
| 9,879,918 B2 | 1/2018 | Noureldin et al. | |
| 9,891,004 B2 | 2/2018 | Noureldin et al. | |
| 2006/0056015 A1 | 3/2006 | Mccoy | |
| 2008/0174115 A1 | 7/2008 | Lambirth | |
| 2008/0190135 A1* | 8/2008 | Mak | F02C 1/04 62/613 |
| 2010/0326131 A1 | 12/2010 | Lengert | |
| 2011/0000205 A1 | 1/2011 | Hauer | |
| 2013/0341929 A1 | 12/2013 | Ho | |
| 2014/0223911 A1 | 8/2014 | Ikegami | |
| 2015/0377079 A1 | 12/2015 | Noureldin et al. | |
| 2016/0369674 A1 | 12/2016 | Younes et al. | |
| 2017/0058708 A1 | 3/2017 | Noureldin et al. | |
| 2017/0058711 A1 | 3/2017 | Noureldin et al. | |
| 2017/0058719 A1 | 3/2017 | Noureldin et al. | |
| 2017/0058721 A1 | 3/2017 | Noureldin et al. | |
| 2019/0048759 A1 | 2/2019 | Noureldin et al. | |

FOREIGN PATENT DOCUMENTS

| | | |
|---|---|---|
| WO | 2017035150 | 3/2017 |
| WO | 2017035166 | 3/2017 |

OTHER PUBLICATIONS

Rahimi et al., "A novel process for low grade heat driven desalination," Desalination, Oct. 15, 2014, vol. 351, pp. 202-212.
International Search Report and Written Opinion issued in International Application No. PCT/US2018/045554 dated Nov. 22, 2018, 21 pages.
International Search Report and Written Opinion issued in International Application No. PCT/US2018/045557 dated Nov. 22, 2018, 19 pages.
International Search Report and Written Opinion issued in International Application No. PCT/US2018/045550 dated Nov. 22, 2018, 18 pages.
International Search Report and Written Opinion issued in International Application No. PCT/US2018/045629 dated Nov. 22, 2018, 16 pages.
International Search Report and Written Opinion issued in International Application No. PCT/US2018/045531 dated Nov. 22, 2018, 20 pages.
International Search Report and Written Opinion issued in International Application No. PCT/US2018/045547 dated Nov. 22, 2018, 20 pages.
International Search Report and Written Opinion issued in International Application No. PCT/US2018/045640 dated Nov. 22, 2018, 19 pages.
International Search Report and Written Opinion issued in International Application No. PCT/US2018/045535 dated Nov. 22, 2018, 23 pages.
International Search Report and Written Opinion issued in International Application No. PCT/US2018/045558 dated Nov. 22, 2018, 22 pages.
International Search Report and Written Opinion issued in International Application No. PCT/US2018/045541 dated Nov. 22, 2018, 17 pages.
International Search Report and Written Opinion issued in International Application No. PCT/US2018/045537 dated Nov. 22, 2018, 16 pages.
International Search Report and Written Opinion issued in International Application No. PCT/US2018/045564 dated Nov. 22, 2018, 21 pages.
International Search Report and Written Opinion issued in International Application No. PCT/US2018/045622 dated Nov. 22, 2018, 18 pages.
Neill and Gunter, "Generation of Electric Power from Waste Heat in the Western Canadian Oil and Gas Industry Phase 1 Report-Scoping Evaluations Rev A," Petroleum Technology Alliance Canada (PTAC), Oct. 2007, 148 pages.
Bahnassi et al., "Achieving product specifications for ethane through to pentane plus from NGL fraction plants," AIChE Fall Conference, Jan. 1, 2005, 21 pages.
Rosenzweig, "Cryogenics for natural gas extraction/fractionation," Chemical engineering, access intelligence association, vol. 1, No. 77, Jan. 12, 1970, 3 pages.
Zhang et al., "Network modeling and design for low grade heat recovery, refrigeration, and utilization in Industrial parks," Industrial and Engineering Chemistry Research, vol. 55, No. 36, Sep. 14, 2016, 13 pages.
Kwak et al., "Integrated design and optimization of technologies for utilizing low grade heat in process industries," Applied Energy, vol. 131, Oct. 1, 2014, 16 pages.

(56) References Cited

OTHER PUBLICATIONS

Lira-Barragan et al., "Sustainable Integration of Trigeneration Systems with Head Exchanger Networks," Industrial & Engineering Chemistry Research, vol. 53, No. 7, Feb. 4, 2014, 19 pages.

Ammar et al., "Low grade thermal energy sources and uses from the process industry in the UK," Applied Energy, Elsevier Science Publishers, vol. 89, No. 1, Jun. 1, 2011, 18 pages.

Gaberiel et al., "Optimization across the water-energy nexus for integrating heat, power, and water for industrial processes, couples with the hybrid thermal-membrane dealination," Industrial and Engineering Chemistry Research, vol. 55, No. 12, Feb. 16, 2016, 25 pages.

Gonzalez-Bravo et al., "Optimal Design for Water Desalination Systems Involving Waste Heat Recovery," Industrial and Engineering Chemistry Research, vol. 56, No. 7, Feb. 8, 2017, 14 pages.

Ophir et al., "Advanced MED process for most economical sea water desalination," Desalination, Elsevier, Amsterdam, NL, vol. 182, No. 1-3, Nov. 1, 2005, 12 pages.

Gnaneswar Gude et al., "Feasibility study of a new two-stage low temperature desalination process," Energy Conversation and Management, Elsevier Science Publishers, vol. 56, Nov. 30, 2011, 7 pages.

Zhu et al., "Hybrid vapor compression refrigeration system with an integrated ejector cooling cycle," International Journal of Refrigeration, vol. 35, 2012, 11 pages.

GCC Examination Report in GCC Appln. No. GC 2018-357994, dated Jan. 29, 2020, 6 pages.

Gulf Cooperation Council Examination Report issued in GCC Application No. GC 2018-35793 dated Dec. 30, 2019, 5 pages.

Gulf Cooperation Council Examination Report issued in GCC Application No. GC 2018-35802 dated Dec. 30, 2019, 6 pages.

Gulf Cooperation Council Examination Report issued in GCC Application No. GC 2018-35800 dated Dec. 30, 2019, 5 pages.

GCC Examination Report in GCC Appln. No. GC 2018-35801, dated Feb. 9, 2020, 4 pages.

GCC Examination Report in GCC Appln. No. GC 2018-35799, dated Feb. 9, 2020, 4 pages.

GCC Examination Report in GCC Appln. No. GC 2018-35795, dated Feb. 9, 2020, 3 pages.

\* cited by examiner

NATURAL GAS LIQUID FRACTIONATION PLANT WASTE HEAT CONVERSION TO POWER USING ORGANIC RANKINE CYCLE

CROSS-REFERENCE TO RELATED APPLICATIONS

This disclosure claims the benefit of priority to U.S. Application Ser. No. 62/542,687 entitled "Utilizing Waste Heat Recovered From Natural Gas Liquid Fractionation Plants," which was filed on Aug. 8, 2017, the entire contents of which are incorporated herein by reference.

TECHNICAL FIELD

This disclosure relates to operating industrial facilities, for example, a natural gas liquid fractionation plant or other industrial facilities that include operating plants that generate heat, for example, a natural gas liquid fractionation plant.

BACKGROUND

Natural gas liquid (NGL) processes are chemical engineering processes and other facilities used in petroleum refineries to transform natural gas into products, for example, liquefied petroleum gas (LPG), gasoline, kerosene, jet fuel, diesel oils, fuel oils, and such products. NGL facilities are large industrial complexes that involve many different processing units and auxiliary facilities, for example, utility units, storage tanks, and such auxiliary facilities. Each refinery can have its own unique arrangement and combination of refining processes determined, for example, by the refinery location, desired products, economic considerations, or such factors. The NGL processes that are implemented to transform the natural gas into the products such as those listed earlier can generate heat, which may not be reused, and byproducts, for example, greenhouse gases (GHG), which may pollute the atmosphere. It is believed that the world's environment has been negatively affected by global warming caused, in part, due to the release of GHG into the atmosphere.

SUMMARY

This specification describes technologies relating to cooling capacity generation, power generation or potable water production from waste heat in a natural gas liquid (NGL) fractionation plant.

The present disclosure includes one or more of the following units of measure with their corresponding abbreviations, as shown in Table 1:

TABLE 1

| Unit of Measure | Abbreviation |
| --- | --- |
| Degrees Celsius | ° C. |
| Megawatts | MW |
| One million | MM |
| British thermal unit | Btu |
| Hour | hr. or H |
| Pounds per square inch (pressure) | psi |
| Kilogram (mass) | Kg |
| Second | S |
| Cubic meters per day | m³/day |
| Fahrenheit | F. |

In a general implementation, a system includes a heating fluid circuit thermally coupled to multiple heat sources of a natural gas liquid (NGL) fractionation plant; a power generation system that includes an organic Rankine cycle (ORC), which includes (i) a working fluid that is thermally coupled to the heating fluid circuit to heat the working fluid, and (ii) an expander configured to generate electrical power from the heated working fluid; and a control system configured to actuate a set of control valves to selectively thermally couple the heating fluid circuit to at least a portion of the multiple heat sources of the NGL fractionation plant.

In an aspect combinable with the general implementation, the working fluid is thermally coupled to the heating fluid circuit in an evaporator of the ORC.

In another aspect combinable with any of the previous aspects, the heating fluid circuit includes a heating fluid tank that is fluidly coupled to the evaporator of the ORC.

In another aspect combinable with any of the previous aspects, the working fluid includes isobutene.

In another aspect combinable with any of the previous aspects, the heating fluid circuit includes water or oil.

In another aspect combinable with any of the previous aspects, the ORC includes a condenser fluidly coupled to a condenser fluid source to cool the working fluid and a pump to circulate the working fluid through the ORC.

In another aspect combinable with any of the previous aspects, the multiple heat sources include a first portion of sub-units of the NGL fractionation plant that include an ethane system, a second portion of sub-units of the NGL fractionation plant that include a propane system, a third portion of sub-units of the NGL fractionation plant that include a butane system, a fourth portion of sub-units of the NGL fractionation plant that include a pentane system, a fifth portion of sub-units of the NGL fractionation plant that include a natural gasoline system, and a sixth portion of sub-units of the NGL fractionation plant that include a solvent regeneration system.

In another aspect combinable with any of the previous aspects, the first portion of sub-units of the NGL fractionation plant includes at least two ethane system heat sources including a first ethane system heat source that includes a heat exchanger that is thermally coupled to an outlet stream of a deethanizer refrigeration compressor, and a second ethane system heat source that comprises a heat exchanger that is thermally coupled to an outlet stream of an ethane dryer.

In another aspect combinable with any of the previous aspects, the second portion of sub-units of the NGL fractionation plant includes at least five propane system heat sources including a first propane system heat source that includes a heat exchanger that is thermally coupled to an outlet stream of a propane dehydrator, a second propane system heat source that includes a heat exchanger that is thermally coupled to an outlet stream of a depropanizer overhead stream, a third propane system heat source that includes a heat exchanger that is thermally coupled to an outlet stream of a propane vapor recovery compressor stream, a fourth propane system heat source that includes a heat exchanger that is thermally coupled to an outlet stream of a propane refrigeration compressor stream, and a fifth propane system heat source that includes a heat exchanger that is thermally coupled to an outlet stream of a propane main compressor stream.

In another aspect combinable with any of the previous aspects, the third portion of sub-units of the NGL fractionation plant includes at least four butane system heat sources including a first butane system heat source that includes a heat exchanger that is thermally coupled to an outlet stream of a butane dehydrator, a second butane system heat source that includes a heat exchanger that is thermally coupled to an outlet stream of a debutanizer overhead stream, a third butane system heat source that includes a heat exchanger that is thermally coupled to an outlet stream of a debutanizer bottoms, and a fourth butane system heat source that includes a heat exchanger that is thermally coupled to an outlet stream of a butane refrigeration compressor stream.

In another aspect combinable with any of the previous aspects, the fourth portion of sub-units of the NGL fractionation plant includes at least one pentane system heat source including a first pentane system heat source that includes a heat exchanger that is thermally coupled to an outlet stream of a depentanizer overhead stream.

In another aspect combinable with any of the previous aspects, the fifth portion of sub-units of the NGL fractionation plant includes at least three natural gasoline system heat sources including a first natural gasoline system heat source that includes a heat exchanger that is thermally coupled to an outlet stream of a natural gasoline decolorizing section pre-flash drum overhead stream, and a second natural gasoline system heat source that includes a heat exchanger that is thermally coupled to an outlet stream of a natural gasoline decolorizer overhead stream, and a third natural gasoline system heat source that includes a heat exchanger that is thermally coupled to an outlet stream of a Reid vapor pressure control column overhead stream.

In another aspect combinable with any of the previous aspects, The sixth portion of sub-units of the NGL fractionation plant includes at least two solvent regeneration system heat sources including a first solvent regeneration system heat source that includes a heat exchanger that is thermally coupled to an outlet stream of an ADIP regeneration section overhead stream, and a second solvent regeneration system heat source that includes a heat exchanger that is thermally coupled to an outlet stream of an ADIP regeneration section bottoms.

In another general implementation, a method of recovering heat energy generated by a natural gas liquid (NGL) fractionation plant includes circulating a heating fluid through a heating fluid circuit thermally coupled to multiple heat sources of a natural gas liquid (NGL) fractionation plant; generating electrical power through a power generation system that includes an organic Rankine cycle (ORC), which includes (i) a working fluid that is thermally coupled to the heating fluid circuit to heat the working fluid with the heating fluid, and (ii) an expander configured to generate electrical power from the heated working fluid; and actuating, with a control system, a set of control valves to selectively thermally couple the heating fluid circuit to at least a portion of the multiple heat sources to heat the heating fluid with the multiple heat sources.

In an aspect combinable with the general implementation, the working fluid is thermally coupled to the heating fluid circuit in an evaporator of the ORC.

In another aspect combinable with any of the previous aspects, the heating fluid circuit includes a heating fluid tank that is fluidly coupled to the evaporator of the ORC.

In another aspect combinable with any of the previous aspects, the working fluid includes isobutene.

In another aspect combinable with any of the previous aspects, the heating fluid circuit includes water or oil.

In another aspect combinable with any of the previous aspects, the ORC includes a condenser fluidly coupled to a condenser fluid source to cool the working fluid and a pump to circulate the working fluid through the ORC.

In another aspect combinable with any of the previous aspects, the multiple heat sources include a first portion of sub-units of the NGL fractionation plant that include an ethane system, a second portion of sub-units of the NGL fractionation plant that include a propane system, a third portion of sub-units of the NGL fractionation plant that include a butane system, a fourth portion of sub-units of the NGL fractionation plant that include a pentane system, a fifth portion of sub-units of the NGL fractionation plant that include a natural gasoline system, and a sixth portion of sub-units of the NGL fractionation plant that include a solvent regeneration system.

In another aspect combinable with any of the previous aspects, the first portion of sub-units of the NGL fractionation plant includes at least two ethane system heat sources including a first ethane system heat source that includes a heat exchanger that is thermally coupled to an outlet stream of a deethanizer refrigeration compressor, and a second ethane system heat source that comprises a heat exchanger that is thermally coupled to an outlet stream of an ethane dryer.

In another aspect combinable with any of the previous aspects, the second portion of sub-units of the NGL fractionation plant includes at least five propane system heat sources including a first propane system heat source that includes a heat exchanger that is thermally coupled to an outlet stream of a propane dehydrator, a second propane system heat source that includes a heat exchanger that is thermally coupled to an outlet stream of a depropanizer overhead stream, a third propane system heat source that includes a heat exchanger that is thermally coupled to an outlet stream of a propane vapor recovery compressor stream, a fourth propane system heat source that includes a heat exchanger that is thermally coupled to an outlet stream of a propane refrigeration compressor stream, and a fifth propane system heat source that includes a heat exchanger that is thermally coupled to an outlet stream of a propane main compressor stream.

In another aspect combinable with any of the previous aspects, the third portion of sub-units of the NGL fractionation plant includes at least four butane system heat sources including a first butane system heat source that includes a heat exchanger that is thermally coupled to an outlet stream of a butane dehydrator, a second butane system heat source that includes a heat exchanger that is thermally coupled to an outlet stream of a debutanizer overhead stream, a third butane system heat source that includes a heat exchanger that is thermally coupled to an outlet stream of a debutanizer bottoms, and a fourth butane system heat source that includes a heat exchanger that is thermally coupled to an outlet stream of a butane refrigeration compressor stream.

In another aspect combinable with any of the previous aspects, the fourth portion of sub-units of the NGL fractionation plant includes at least one pentane system heat source including a first pentane system heat source that includes a heat exchanger that is thermally coupled to an outlet stream of a depentanizer overhead stream.

In another aspect combinable with any of the previous aspects, the fifth portion of sub-units of the NGL fractionation plant includes at least three natural gasoline system heat sources including a first natural gasoline system heat source that includes a heat exchanger that is thermally coupled to an outlet stream of a natural gasoline decolorizing section pre-flash drum overhead stream, and a second natural gasoline system heat source that includes a heat exchanger that is thermally coupled to an outlet stream of a natural gasoline decolorizer overhead stream, and a third natural gasoline system heat source that includes a heat exchanger that is thermally coupled to an outlet stream of a Reid vapor pressure control column overhead stream.

In another aspect combinable with any of the previous aspects, the sixth portion of sub-units of the NGL fractionation plant includes at least two solvent regeneration system heat sources including a first solvent regeneration system heat source that includes a heat exchanger that is thermally coupled to an outlet stream of an ADIP regeneration section overhead stream, and a second solvent regeneration system heat source that includes a heat exchanger that is thermally coupled to an outlet stream of an ADIP regeneration section bottoms.

The details of one or more implementations of the subject matter described in this specification are set forth in the accompanying drawings and the detailed description. Other features, aspects, and advantages of the subject matter will become apparent from the description, the drawings, and the claims.

BRIEF DESCRIPTION OF THE DRAWINGS

FIG. 1O is a diagram of natural gasoline vapor section waste heat recovery system in a NGL plant.

DETAILED DESCRIPTION

NGL Plant

Figure 1A:
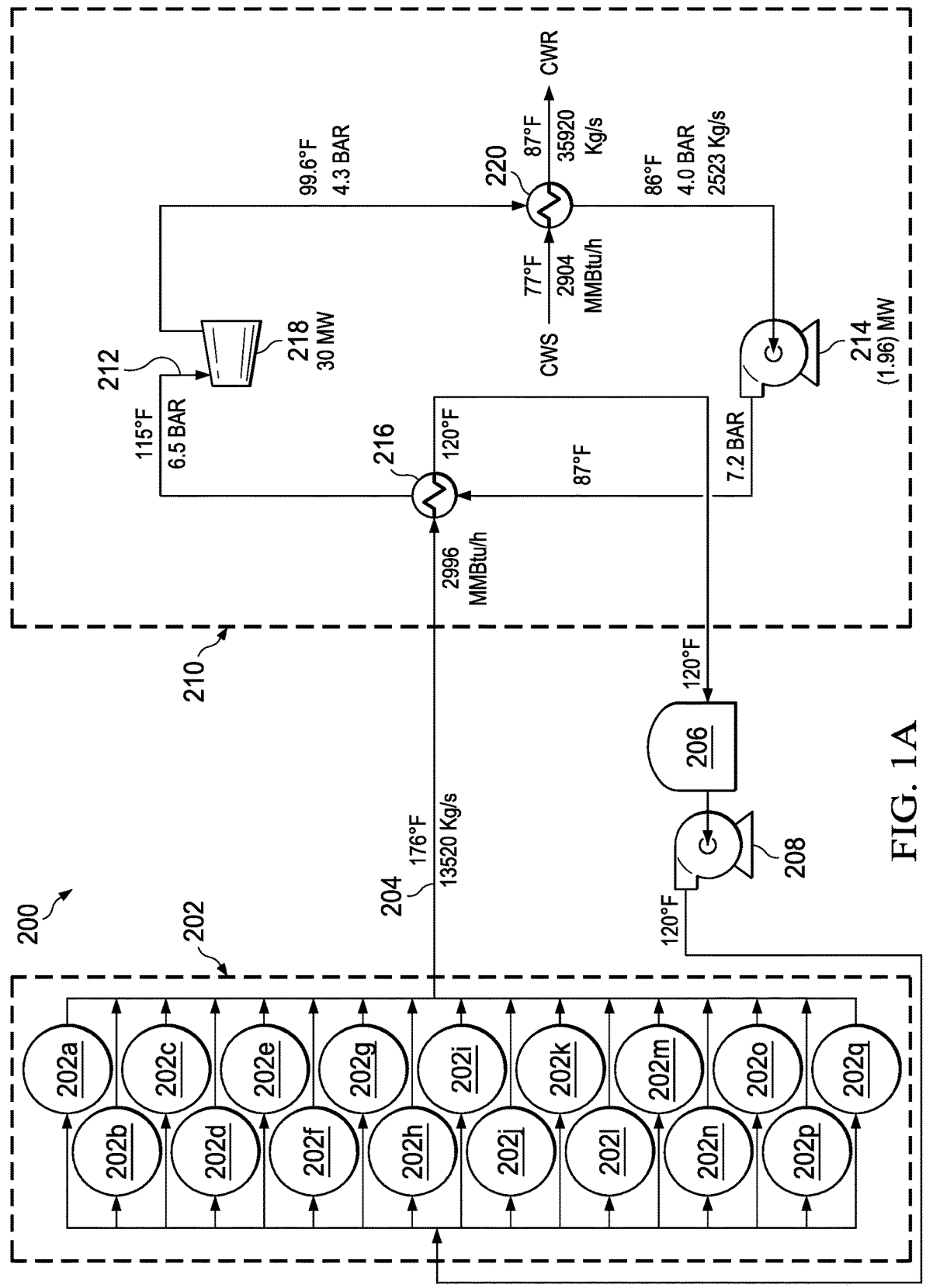
FIG. 1A is a diagram of an organic Rankine cycle (ORC) based waste heat to power conversion plant that uses waste heat from one or more heat sources in a NGL fractionation plant.

Gas processing plants can purify raw natural gas or crude oil production associated gases (or both) by removing common contaminants such as water, carbon dioxide and hydrogen sulfide. Some of the substances which contaminate natural gas have economic value and can be processed or sold or both. Upon the separation of methane gas, which is useful as sales gas for houses and power generation, the remaining hydrocarbon mixture in liquid phase is called natural gas liquids (NGL). The NGL is fractionated in a separate plant or sometimes in the same gas processing plant into ethane, propane and heavier hydrocarbons for several versatile uses in chemical and petrochemical as well as transportation industries. The NGL fractionation plant uses the following processes or sections: fractionation, product treating, and natural gasoline processing. The fractionation processes or sections can include heat sources (also commonly referred to as streams) including, but not limited to, a propane condenser, a propane refrigerant condenser, a naphtha cooler, a depentanizer condenser, an amine-di-iso-propanol (ADIP) cooler, a regenerator overhead (OVHD) condenser, a Reid vapor pressure (RVP) column condenser, a depropanizer condenser, a debutanizer condenser, or combinations thereof. The product treating processes or sections can include the following non-limiting heat sources: a propane dehydrator condenser, a butane dehydrator condenser, a propane condenser, an air-cooled condenser, a regeneration gas cooler, and a butane condenser, or combinations thereof. The natural gasoline processing processes or sections can include, but are not limited to, a natural gasoline (NG) flash vapor condenser, a NG decolorizer condenser, or combinations thereof.

Fractionation Section

Fractionation is the process of separating the different components of natural gas. Separation is possible because each component has a different boiling point. At temperatures less than the boiling point of a particular component, that component condenses to a liquid. It is also possible to increase the boiling point of a component by increasing the pressure. By using columns operating at different pressures and temperatures, the NGL fractionation plant is capable of separating ethane, propane, butane, pentane, or combinations thereof (with or without heavier associated hydrocarbons) from NGL fractionation feeds. Deethanizing separates ethane from C2+ NGL, where C2 refers to a molecule containing two carbon atoms (ethane), and where C2+ refers to a mixture containing molecules having two or more carbon atoms, for example, a NGL containing C2, C3, C4, C5 can be abbreviated as "C2+ NGL." Depropanizing and debutanizing separate propane and butane, respectively, from C3+ NGL and C4+ NGL, respectively. Because the boiling points of heavier natural gases are closer to each other, such gases can be harder to separate compared to lighter natural gases. Also, a rate of separation of heavier components is less than that of comparatively lighter components. In some instances, the NGL fractionation plant can implement, for example, about 45 distillation trays in the deethanizer, about 50 trays in the depropanizer, and about 55 trays in the debutanizer.

The fractionation section can receive a feed gas containing C2+ NGL from gas plants, which are upstream plants that condition and sweeten the feed gas, and produce a sales gas, such as a C1/C2 mixture, where C1 is about 90%, as a final product. The C2+ NGL from gas plants can be further processed in the NGL fractionation plant for C2+ recovery. From feed metering or surge unit metering (or both), feed flows to the three fractionation modules, namely, the deethanizing module, the depropanizing module and the debutanizing module, each of which is described later.

Deethanizer Module (or Deethanizer Column)

The C2+ NGL is pre-heated before entering the deethanizer column for fractionation. The separated ethane leaves the column as overhead gas. The ethane gas is condensed by a closed-loop propane refrigeration system. After being cooled and condensed, the ethane is a mixture of gas and liquid. The liquid ethane is separated and pumped back to the top of the column as reflux. The ethane gas is warmed in an economizer and then sent to users. The bottoms product from the deethanizer reboiler is C3+ NGL, which is sent to the depropanizer module.

Depropanizer Module (or Depropanizer Column)

From the deethanizer module, C3+ NGL enters the depropanizer module for fractionation. The separated propane leaves the column as overhead gas. The gas is condensed using coolers. The propane condensate is collected in a reflux drum. Some of the liquid propane is pumped back to the column as reflux. The rest of the propane is either treated or sent to users as untreated product. The bottoms product from the depropanizer reboiler, C4+ is then sent to the debutanizer module Debutanizer Module (or Debutanizer Column)

C4+ enters the debutanizer module for fractionation. The separated butane leaves the column as overhead gas. The gas is condensed using coolers. The butane condensate is collected in a reflux drum. Some of the liquid butane is pumped back to the column as reflux. The rest of the butane is either treated or sent to users as untreated product. The bottoms product from the debutanizer reboiler, C5+ natural gas (NG) goes on to a RVP control section (which may also be referred to as a rerun unit), which will be discussed in greater detail in a later section.

Product Treating Section

While ethane requires no further treatment, propane and butane products are normally treated to remove hydrogen sulfide ($H_2S$), carbonyl sulfide (COS), and mercaptan sulfur (RSH). Then, the products are dried to remove any water. All exported product is treated, while untreated products can go to other industries. As described later, propane receives ADIP treating, MEROX™ (Honeywell UOP; Des Plaines, Ill.) treating, and dehydration. Butane receives MEROX treating, and dehydration.

ADIP Treating Section

ADIP is a solution of di-isopropanol amine and water. ADIP treating extracts $H_2S$ and COS from propane. The ADIP solution, through contact with the sour propane, absorbs the $H_2S$ and COS. The ADIP solution first contacts the sour propane in an extractor. In the extractor, the ADIP absorbs most of the $H_2S$ and some of the COS. The propane then passes through a mixer/settler train where the propane contacts with ADIP solution to extract more $H_2S$ and COS. This partially sweetened propane is cooled and then washed with water to recover the ADIP entrained with the propane. The propane is then sent to MEROX treating, which is described later. The rich ADIP that has absorbed the $H_2S$ and COS leaves the bottom of the extractor and is regenerated into lean ADIP for reuse. The regenerator column has a temperature and pressure that are suitable for acid gas removal. When the rich ADIP enters the regenerator, the entrained acid gases are stripped. As the acid gases leaves the regenerator as overhead, any free water is removed to prevent acid formation. The acid gases are then sent to flare. The lean ADIP leaves the extractor bottom and is cooled and filtered. Lean ADIP returns to the last mixer/settler and flows back through the system in the counter-current direction of the propane to improve contact between the propane and ADIP, which improves $H_2S$ and COS extraction.

C3/C4 MEROX Treating Section

MEROX treating removes mercaptan sulfur from C3/C4 product. Mercaptans are removed using a solution of sodium hydroxide (NaOH), also known by the commercial name caustic soda (hereinafter referred to as "caustic") and MEROX. The MEROX catalyst facilitates the oxidation of mercaptans to disulfides. The oxidation takes place in an alkaline environment, which is provided by using the caustic solution. MEROX treating for C3 and C4 is similar. Both products are prewashed with caustic to remove any remaining traces of $H_2S$, COS, and $CO_2$. This prevents damage to the caustic that is used in MEROX treating. After prewashing, product flows to an extractor, where a caustic solution with MEROX catalyst contacts with the product. The caustic/catalyst solution converts the mercaptans into mercaptides. The sweetened product, which is lean on acid gases, leaves the extractor as overhead and any remaining caustic is separated. Caustic leaves the bottom of both product extractors rich with mercaptides. The rich caustic is regenerated into lean caustic for reuse. The C3/C4 extraction sections share a common caustic regeneration section, namely, an oxidizer. Before entering the bottom of the oxidizer, the rich caustic is injected with MEROX catalyst to maintain proper catalyst concentration, heated, and mixed with process air. In the oxidizer, the mercaptides are oxidized into disulfides. The mixture of disulfides, caustic, and air leave the oxidizer as overhead. The air, disulfide gases, and disulfide oil are separated from the regenerated caustic. The regenerated caustic is pumped to the C3/C4 extractor. Regenerated caustic with any residual disulfides is washed with NG in the NG wash settler.

C3/C4 Dehydration Section

Propane or butane products (or both) contain water when they leave MEROX treating. Dehydration removes moisture in such products through adsorption before the products flow to refrigeration and storage. The dehydration processes for C3 and C4 are similar. Both C3/C4 dehydration sections have two dehydrators containing molecular sieve desiccant beds. One dehydrator is in service while the other undergoes regeneration. Regeneration consists of heating the sieve beds to remove moisture, then cooling the beds before reuse. During drying, product flows up and through the molecular sieve bed, which adsorbs (that is, binds to its surface) moisture. From the top of the dehydrator, dry C3/C4 products flow to refrigeration.

Natural Gasoline (NG) Processing Section

NG processing includes RVP control, decolorizing and depentanizing sections.

RVP Control Section

A Reid vapor pressure (RVP) control section (or rerun unit) is a fractionator column that receives the C5+NG from the debutanizer bottom. The RVP control section collects a pentane product. The RVP control section can be used to adjust the RVP of the pentane product at a rerun fractionator overhead before the pentane product is sent to a pentane storage tank. RVP is a measure of the ability of a hydrocarbon to vaporize. RVP (sometimes called volatility) is an important specification in gasoline blending. The RVP control section stabilizes the RVP of NG by removing small amounts of pentane. Depending on operational requirements, the RVP control section can be totally or partially bypassed. NG from the debutanizer bottoms goes to the RVP column where a controlled amount of pentane is stripped and leaves the column as overhead gas. As in NGL fractionation, the overhead gas is condensed with coolers, and some of the condensate is pumped back to the column as reflux. The remaining pentane is cooled and sent to storage. If the RVP column bottoms product (NG) meets color specifications, it is sent to storage. If not, it is sent to decolorizing.

Decolorizing Section

The decolorizing section removes color bodies from NG. Color bodies are traces of heavy ends found in the debutanizer bottoms product. Other impurities such as corrosion products from the pipeline may also be present. These must be removed for NG to meet the color specification. Decolorizer feed can be RVP column bottoms product or debutanizer bottoms product, or a combination of both. Additional natural gasoline can also be supplied from other facilities to maintain a hexane plus (C6+) product supply. If decolorizing is needed, NG first passes through a pre-flash-drum. A large portion of the lighter NG components vaporizes and leaves the drum as overhead. The heavier NG components remain along with the color bodies and are fed to the decolorizer column, where the remaining color bodies are separated. The NG leaves the decolorizer as overhead gas and is condensed and collected in the NG product drum, with some pumped back to the column as reflux. Overhead from the column and flash drum are joined and pumped to either the depentanizer (described later) or cooled and sent to storage in the feed product surge unit. The color bodies leave the decolorizer as bottoms product and are pumped to the feed and surge unit to be injected into a crude line.

Depentanizing Section

Depentanizing uses a fractionation column to produce a pentane overhead product and a C6+ bottoms product. Both the pentane product and the C6+ bottoms product are separately fed to storage or downstream the petrochemical plants. The feed to the depentanizer is the NG product stream from the decolorizing section. Feed can be increased or decreased based on the demand for C6+ bottoms product. If the NGL fractionation plant NG production cannot meet demand, NG can be imported from oil refineries. The decolorized NG is preheated before entering the depentanizer. The separated pentane leaves the column as overhead gas. The overhead condensers cool the overhead stream, and some is pumped back to the column as reflux. The remaining pentane is cooled and sent to storage. Light NG in the bottoms is vaporized and returned to heat the depentanizer. The remaining bottoms product is cooled and sent to storage as C6+.

Table 2 lists duty per train of major waste heat streams in an example of an NGL fractionation plant.

TABLE 2

| Stream Name | Duty/train (MMBtu/h) |
| --- | --- |
| Propane refrigerant condenser | 94 |
| Propane dehydration condenser | 22 |
| Butane dehydrator condenser | 9 |
| Naphtha cooler | 11 |
| Depentanizer condenser | 100 |
| ADIP cooler | 73 |
| Regenerator OVHD condenser | 18 |
| NG flash vapor condenser | 107 |
| NG decolorizer condenser | 53 |
| Natural gasoline (cooling) process propane condenser | 29 |
| Fractionation propane condenser | 81 |
| Air cooled condenser | 16 |
| Regeneration gas cooler | 22 |
| RVP column condenser | 36 |
| Butane condenser | 49 |
| Depropanizer condenser | 194 |
| Debutanizer condenser | 115 |

In Table 2, "Duty/train" represents each stream's thermal duty in millions Btu per hour (MMBtu/h) per processing train. A typical NGL fractionation plant includes three to four processing trains.

The systems described in this disclosure can be integrated with a NGL fractionation plant to make the fractionation plant more energy efficient or less polluting or both. In particular, the energy conversion system can be implemented to recover low grade waste heat from the NGL fractionation plant. Low grade waste heat is characterized by a temperature difference between a source and sink of the low grade heat steam being between 65° C. and 232° C. (150° F. and 450° F.). The NGL fractionation plant is an attractive option for integration with energy conversion systems due to a large amount of low grade waste heat generated by the plant and an absence of a need for deep cooling. Deep cooling refers to a temperature that is less than ambient that uses a refrigeration cycle to maintain.

The low grade waste heat from an NGL fractionation plant can be used for commodities such as carbon-free power generation, cooling capacity generation, potable water production from sea water, or combinations thereof. Low grade waste heat is characterized by a temperature ranging between 65° C. and 232° C. (150° F. to 450° F.). The waste heat can be used for the mono-generation, co-generation, or tri-generation of one or more or all of the commodities mentioned earlier. Low grade waste heat from the NGL fractionation plant can be used to provide in-plant sub-ambient cooling, thus reducing the consumption of power or fuel (or both) of the plant. Low grade waste heat from the NGL fractionation plant can be used to provide ambient air conditioning or cooling in the industrial community or in a nearby non-industrial community, thus helping the community to consume energy from alternative sources. In addition, the low grade waste heat can be used to desalinate water and produce potable water to the plant and adjacent community. An NGL fractionation plant is selected for low grade waste heat recovery because of a quantity of low grade waste heat available from the NGL fractionation plant as well as a cooling requirement of the plant to ambient temperature cooling (instead of deep cooling).

The energy conversion systems described in this disclosure can be integrated into an existing NGL fractionation plant as a retrofit or can be part of a newly constructed NGL fractionation plant. A retrofit to an existing NGL fractionation plant allows the carbon-free power generation, and fuel savings advantages offered by the energy conversion systems described here to be accessible with a reduced capital investment. For example, the energy conversion systems described here can produce one or more or all of substantially between 35 MW and 40 MW (for example, 37 MW) of carbon-free power, substantially between 100,000 and 150,000 m$^3$/day (for example, 120,000 m$^3$/day) of desalinated water, and substantially between 350 MM BTU/h and 400 MM BTU/h (for example, 388 MM BTU/h) of cooling capacity for in-plant or community utilization or both.

As described later, the systems for waste heat recovery and re-use from the NGL fractionation plant can include modified multi-effect distillation (MED) systems, customized Organic Rankine Cycle (ORC) systems, unique ammonia-water mixture Kalina cycle systems, customized modified Goswami cycle systems, mono-refrigerant specific vapor compression-ejector-expander triple cycle systems, or combinations of one or more of them. Details of each disclosure are described in the following paragraphs.

Heat Exchangers

In the configurations described in this disclosure, heat exchangers are used to transfer heat from one medium (for example, a stream flowing through a plant in a NGL fractionation plant, a buffer fluid or such medium) to another medium (for example, a buffer fluid or different stream flowing through a plant in the NGL fractionation plant). Heat exchangers are devices which transfer (exchange) heat typically from a hotter fluid stream to a relatively less hotter fluid stream. Heat exchangers can be used in heating and cooling applications, for example, in refrigerators, air conditions or such cooling applications. Heat exchangers can be distinguished from one another based on the direction in which fluids flow. For example, heat exchangers can be parallel-flow, cross-flow or counter-current. In parallel-flow heat exchangers, both fluid involved move in the same direction, entering and exiting the heat exchanger side-by-side. In cross-flow heat exchangers, the fluid path runs perpendicular to one another. In counter-current heat exchangers, the fluid paths flow in opposite directions, with one fluid exiting whether the other fluid enters. Counter-current heat exchangers are sometimes more effective than the other types of heat exchangers.

In addition to classifying heat exchangers based on fluid direction, heat exchangers can also be classified based on their construction. Some heat exchangers are constructed of multiple tubes. Some heat exchangers include plates with room for fluid to flow in between. Some heat exchangers enable heat exchange from liquid to liquid, while some heat exchangers enable heat exchange using other media.

Heat exchangers in a NGL fractionation plant are often shell and tube type heat exchangers which include multiple tubes through which fluid flows. The tubes are divided into two sets—the first set contains the fluid to be heated or cooled; the second set contains the fluid responsible for triggering the heat exchange, in other words, the fluid that either removes heat from the first set of tubes by absorbing and transmitting the heat away or warms the first set by transmitting its own heat to the fluid inside. When designing this type of exchanger, care must be taken in determining the correct tube wall thickness as well as tube diameter, to allow optimum heat exchange. In terms of flow, shell and tube heat exchangers can assume any of three flow path patterns.

Heat exchangers in NGL facilities can also be plate and frame type heat exchangers. Plate heat exchangers include thin plates joined together with a small amount of space in between, often maintained by a rubber gasket. The surface area is large, and the corners of each rectangular plate feature an opening through which fluid can flow between plates, extracting heat from the plates as it flows. The fluid channels themselves alternate hot and cold liquids, meaning that the heat exchangers can effectively cool as well as heat fluid. Because plate heat exchangers have large surface area, they can sometimes be more effective than shell and tube heat exchangers.

Other types of heat exchangers can include regenerative heat exchangers and adiabatic wheel heat exchangers. In a regenerative heat exchanger, the same fluid is passed along both sides of the exchanger, which can be either a plate heat exchanger or a shell and tube heat exchanger. Because the fluid can get very hot, the exiting fluid is used to warm the incoming fluid, maintaining a near constant temperature. Energy is saved in a regenerative heat exchanger because the process is cyclical, with almost all relative heat being transferred from the exiting fluid to the incoming fluid. To maintain a constant temperature, a small quantity of extra energy is needed to raise and lower the overall fluid temperature. In the adiabatic wheel heat exchanger, an intermediate liquid is used to store heat, which is then transferred to the opposite side of the heat exchanger. An adiabatic wheel consists of a large wheel with threads that rotate through the liquids—both hot and cold—to extract or transfer heat. The heat exchangers described in this disclosure can include any one of the heat exchangers described earlier, other heat exchangers, or combinations of them.

Each heat exchanger in each configuration can be associated with a respective thermal duty (or heat duty). The thermal duty of a heat exchanger can be defined as an amount of heat that can be transferred by the heat exchanger from the hot stream to the cold stream. The amount of heat can be calculated from the conditions and thermal properties of both the hot and cold streams. From the hot stream point of view, the thermal duty of the heat exchanger is the product of the hot stream flow rate, the hot stream specific heat, and a difference in temperature between the hot stream inlet temperature to the heat exchanger and the hot stream outlet temperature from the heat exchanger. From the cold stream point of view, the thermal duty of the heat exchanger is the product of the cold stream flow rate, the cold stream specific heat and a difference in temperature between the cold stream outlet from the heat exchanger and the cold stream inlet temperature from the heat exchanger. In several applications, the two quantities can be considered equal assuming no heat loss to the environment for these units, particularly, where the units are well insulated. The thermal duty of a heat exchanger can be measured in watts (W), megawatts (MW), millions of British Thermal Units per hour (Btu/hr.), or millions of kilocalories per hour (Kcal/h). In the configurations described here, the thermal duties of the heat exchangers are provided as being "about X MW," where "X" represents a numerical thermal duty value. The numerical thermal duty value is not absolute. That is, the actual thermal duty of a heat exchanger can be approximately equal to X, greater than X or less than X.

Flow Control System

In each of the configurations described later, process streams (also called "streams") are flowed within each plant in a NGL fractionation plant and between plants in the NGL fractionation plant. The process streams can be flowed using one or more flow control systems implemented throughout the NGL fractionation plant. A flow control system can include one or more flow pumps to pump the process streams, one or more flow pipes through which the process streams are flowed and one or more valves to regulate the flow of streams through the pipes.

In some implementations, a flow control system can be operated manually. For example, an operator can set a flow rate for each pump and set valve open or close positions to regulate the flow of the process streams through the pipes in the flow control system. Once the operator has set the flow rates and the valve open or close positions for all flow control systems distributed across the NGL fractionation plant, the flow control system can flow the streams within a plant or between plants under constant flow conditions, for example, constant volumetric rate or such flow conditions. To change the flow conditions, the operator can manually operate the flow control system, for example, by changing the pump flow rate or the valve open or close position.

In some implementations, a flow control system can be operated automatically. For example, the flow control system can be connected to a computer system to operate the flow control system. The computer system can include a computer-readable medium storing instructions (such as flow control instructions and other instructions) executable by one or more processors to perform operations (such as flow control operations). An operator can set the flow rates and the valve open or close positions for all flow control systems distributed across the NGL fractionation plant using the computer system. In such implementations, the operator can manually change the flow conditions by providing inputs through the computer system. Also, in such implementations, the computer system can automatically (that is, without manual intervention) control one or more of the flow control systems, for example, using feedback systems implemented in one or more plants and connected to the computer system. For example, a sensor (such as a pressure sensor, temperature sensor or other sensor) can be connected to a pipe through which a process stream flows. The sensor can monitor and provide a flow condition (such as a pressure, temperature, or other flow condition) of the process stream to the computer system. In response to the flow condition exceeding a threshold (such as a threshold pressure value, a threshold temperature value, or other threshold value), the computer system can automatically perform operations. For example, if the pressure or temperature in the pipe exceeds the threshold pressure value or the threshold temperature value, respectively, the computer system can provide a signal to the pump to decrease a flow rate, a signal to open a valve to relieve the pressure, a signal to shut down process stream flow, or other signals.

FIG. 1A-1O are schematic illustrations of a power generation system that utilizes waste heat from one or more heat sources in a natural gas liquid (NGL) fractionation plant.

Figure 1B:
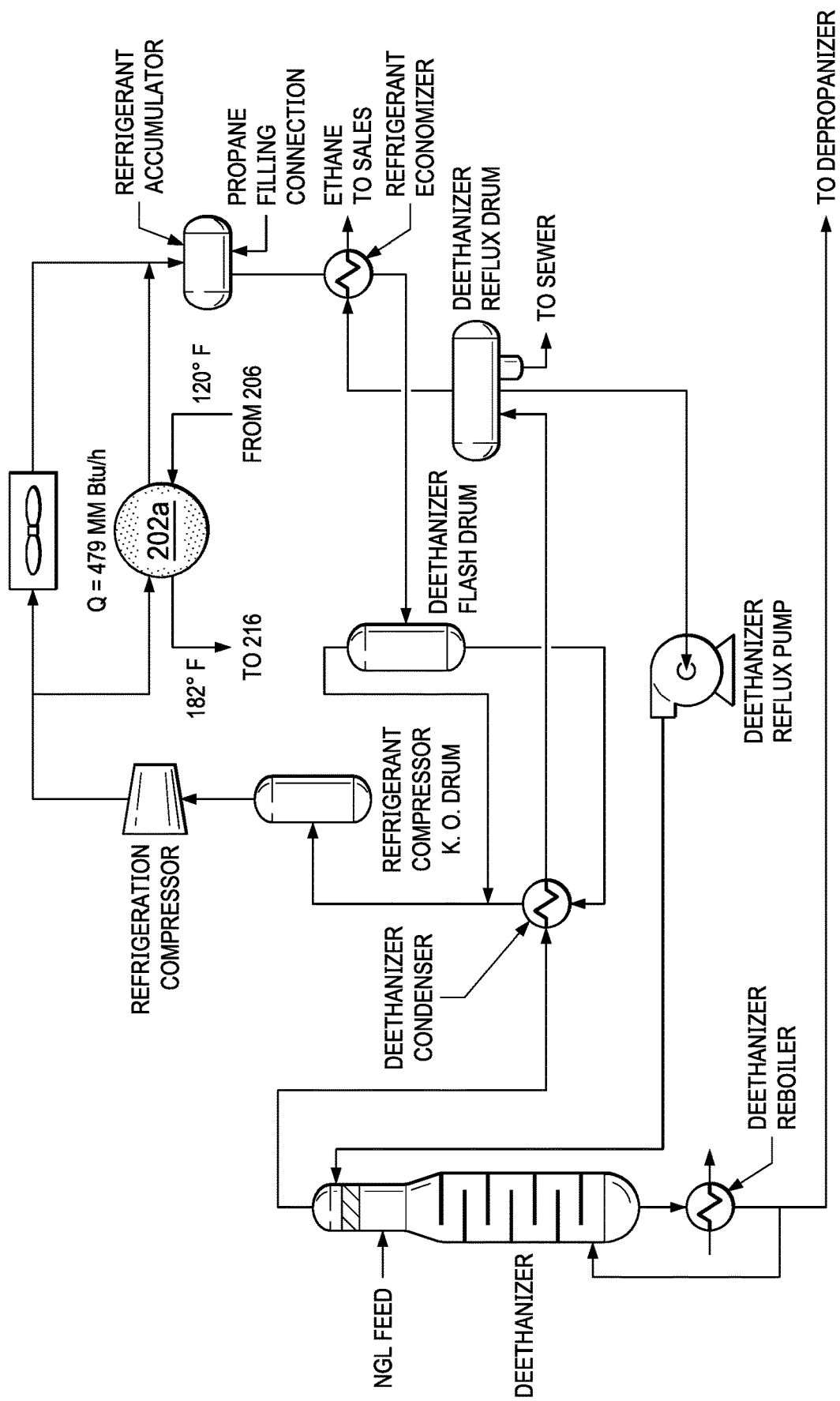
FIG. 1B is a diagram of a deethanizer section waste heat recovery system in a NGL plant.

FIG. 1A is a schematic diagram of an example system 200 to recover waste heat from heat sources in an NGL fractionation plant. FIG. 1B-1O are schematic diagrams illustrating the location of the heat sources within the NGL fractionation plant, as well as the interaction (for example, fluid and thermal) with existing components of the NGL fractionation plant. In this example system 200, there are seventeen heat sources in the NGL fractionation plant.

Generally, the NGL fractionation plant contains a large amount of low grade waste heat. This waste heat can be used to produce water, cooling, power, or a combination of two or more. In some aspects, embodiments of the present disclosure include a system (such as system 200) that recovers the waste heat available in the NGL fractionation plant using a heat recovery network that includes multiple (for example, seventeen in some embodiments) heat exchangers distributed in particular areas of the NGL fractionation plant. In some embodiments, the system 200 can generate about 30 MW using an organic Rankine cycle (ORC) system. The low grade waste heat is recovered from processing units within the NGL fractionation using, for example, a buffer stream such as hot oil or pressurized water.

In example embodiments, the buffer stream flows from a storage tank at about 120° F. and is directed towards specific units in the NGL fractionation plant to recover particular amounts of thermal energy, as shown in FIG. 1B-1O. The thermal energy absorbed from the NGL fractionation plant increases the buffer stream original temperature from about 120° F. to about 176° F. The buffer stream at 176° F. is then used as shown in FIG. 1A to produce about 30 MW using the ORC system (described later). The buffer stream temperature is reduced in the ORC system to about 120° F. and flows back to the storage tank.

FIG. 1A is a schematic diagram of an example system 200 to recover waste heat from the seventeen heat sources in the NGL fractionation plant. In some implementations, the system 200 can include a heating fluid circuit 202 thermally coupled to the multiple heat sources. For example, the multiple heat sources can include the seventeen heat exchangers, including a first heat exchanger 202a, a second heat exchanger 202b, a third heat exchanger 202c, a fourth heat exchanger 202d, a fifth heat exchanger 202e, a sixth heat exchanger 202f, a seventh heat exchanger 202g, an eighth heat exchanger 202h, a ninth heat exchanger 202i, a tenth heat exchanger 202j, an eleventh heat exchanger 202k, a twelfth heat exchanger 202l, a thirteenth heat exchanger 202m, a fourteenth heat exchanger 202n, a fifteenth heat exchanger 202o, a sixteenth heat exchanger 202p, and a seventeenth heat exchanger 202q. In some implementations, the seventeen heat sources can be connected in parallel (for example, relative to a flow of a buffer fluid). In some implementations, a single heat exchanger shown in a figure may illustrate one or more heat exchangers.

The example system 200 can include a power generation system 210 that includes an organic Rankine cycle (ORC). The ORC can include a working fluid that is thermally coupled to the heating fluid circuit 202 to heat the working fluid 212. In some implementations, the working fluid can be isobutane. The ORC can also include a gas expander 218 configured to generate electrical power from the heated working fluid. As shown in FIG. 1A, the ORC can additionally include an evaporator 216, a pump 214 and a condenser 220. In some implementations, the working fluid can be thermally coupled to the heating fluid circuit 202 in the evaporator 216.

In operation, a heating fluid 204 (for example, water, oil, or such fluid) is circulated through the seventeen heat exchangers. An inlet temperature of the heating fluid 204 that is circulated into the inlets of each of the seventeen heat sources is the same or substantially the same subject to any temperature variations that may result as the heating fluid 204 flows through respective inlets. Each heat exchanger heats the heating fluid 204 to a respective temperature that is greater than the inlet temperature. The heated heating fluid 204 from the seventeen heat exchangers are combined and flowed through the evaporator 216 of the ORC. Heat from the heated heating fluid 204 heats the working fluid 212 of the ORC thereby increasing the working fluid temperature and evaporating the working fluid 212. The heat exchange with the working fluid 212 results in a decrease in the temperature of the heating fluid 204. The heating fluid 204 is then collected in a heating fluid tank 206 and can be pumped, by a pump 208, back through the heating fluid circuit 202 to restart the waste heat recovery cycle.

The heating fluid circuit 202 that flows heating fluid 204 through the heating fluid circuit 202 can include multiple valves that can be operated manually or automatically. For example, the NGL fractionation plant can be fitted with the heating fluid flow pipes and valves. An operator can manually open each valve in the circuit to cause the heating fluid 204 to flow through the circuit 202. To cease waste heat recovery to perform repair or maintenance or for other reasons, for example, the operator can manually close each valve in the circuit 202. Alternatively, a control system, for example, a computer-controlled control system, can be connected to each valve in the circuit 202. The control system can automatically control the valves based, for example, on feedback from sensors (for example, temperature, pressure or such sensors), installed at different locations in the circuit 202. The control system can also be operated by an operator.

In the manner described earlier, the heating fluid 204 can be looped through the heating fluid circuit 202 to recover heat that would otherwise go to waste in the NGL fractionation plant, and to use the recovered waste heat to operate the power generation system 210. By doing so, an amount of energy needed to operate the power generation system 210 can be decreased while obtaining the same or substantially similar power output from the power generation system 210. For example, the power output from the power generation system 210 that implements the waste heat recovery network can be higher or lower than the power output from a power generation system that does not implement the waste heat recovery network. Where the power output is less, the difference may not be statistically significant. Consequently, a power generation efficiency of the NGL fractionation plant can be increased.

FIG. 1A shows the power generation system 210 as an ORC cycle that uses, for example, isobutane liquid as the working fluid 212 at about 7 to 9 bar to recover about 3000 MM BTU/h of waste heat from the heating fluid 204 (for example, oil or water) that collects thermal energy from specific units in the NGL fractionation plant. The heating fluid 204, at a temperature of about 176° F., is used to preheat and vaporize the working fluid 212 (for example, at about 7 bar and 87° F.) in the evaporator 216. The working fluid 212, as a vapor, flows to the gas expander 218 (for example, turbine and generator set) to generate about 30 MW of power. The superheated vapor of the working fluid 212 leaving the gas expander 218 is then condensed using a condenser (for example, with water as a cooling medium at 77° F.). The condensed working fluid 212 is then pumped back to the cycle operating pressure and the cycle continues in the evaporator 216.

FIG. 1B shows the first heat exchanger 202a in a deethanizer section of the NGL fractionation plant. In this example, the heat exchanger 202a is positioned and thermally coupled to a heat source to recover waste heat from the refrigeration compressor(s) of the deethanizer reflux generation unit(s). The heating fluid 204 is circulated from the tank 206 at 120° F. to heat exchanger 202a to cool down the outlet stream of the deethanizer refrigeration compressor. The heating fluid 204 is heated in the heat exchanger 202a to between about 177° F. and 187° F., for example, about 182° F. before it flows to a collection header to join other heating fluid streams from other parts of the NGL fractionation plant to flow to the power generation system 210. The total thermal duty of the heat exchanger 202a is about 479 MM BTU/H.

Figure 1C:
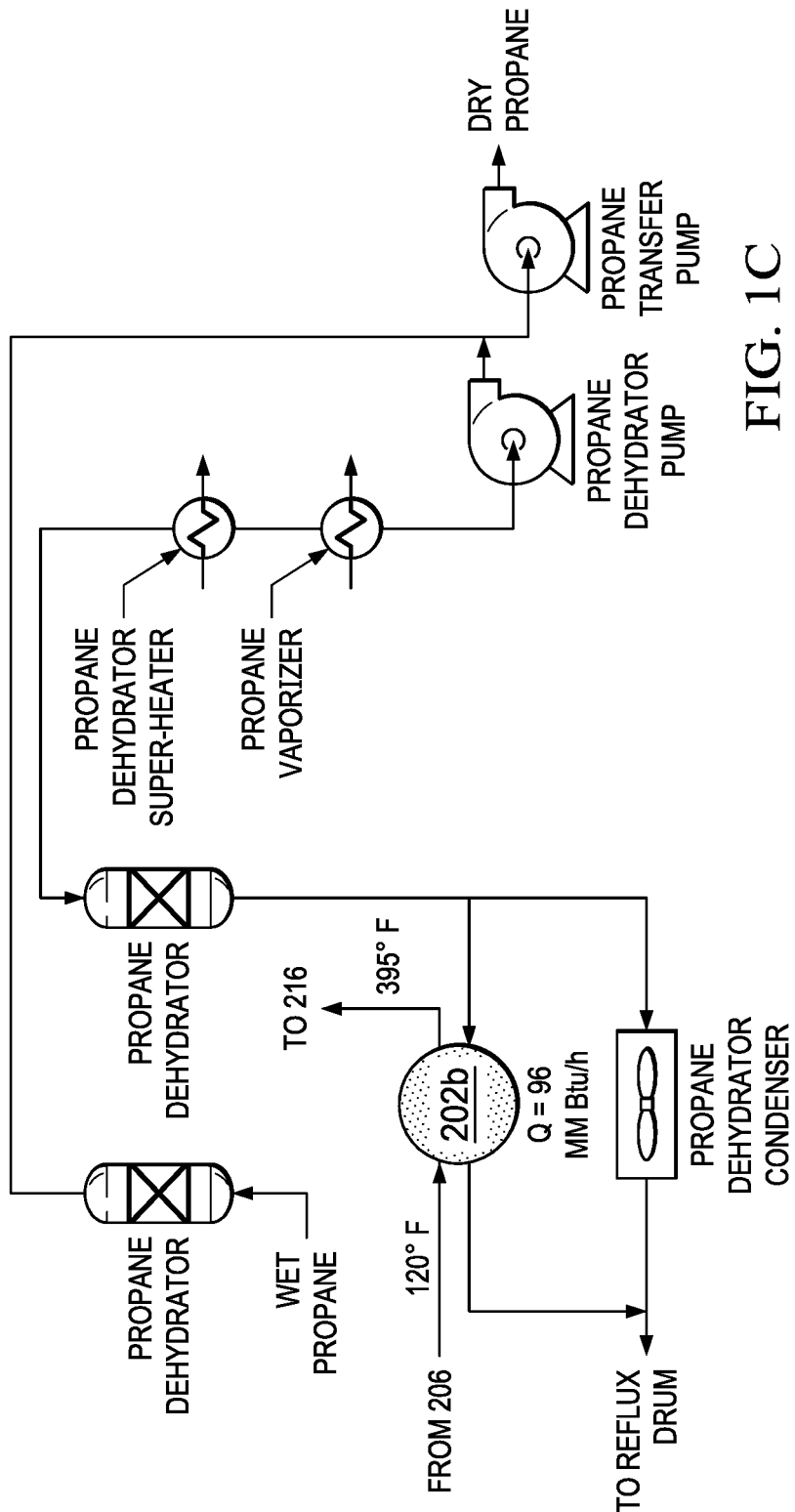
FIG. 1C is a diagram of a propane dehydrator section waste heat recovery system in a NGL plant.

FIG. 1C shows the second heat exchanger 202b in a propane dehydrator section of the NGL fractionation plant. In this example, the heat exchanger 202b is positioned and thermally coupled to a heat source to recover waste heat from the propane dehydration section. The heating fluid 204 is circulated from the storage tank 206 at 120° F. to heat exchanger 202b to cool down the outlet stream of the propane dehydrator. The heating fluid 204 is heated in the heat exchanger 202b to between about 390° F. and 400° F., for example, about 395° F. before it is circulated to the collection header to join other heating fluid streams from other parts of the NGL fractionation plant to flow to the power generation system 210. The total thermal duty of the heat exchanger 202b is about 96 MM BTU/H.

Figure 1D:
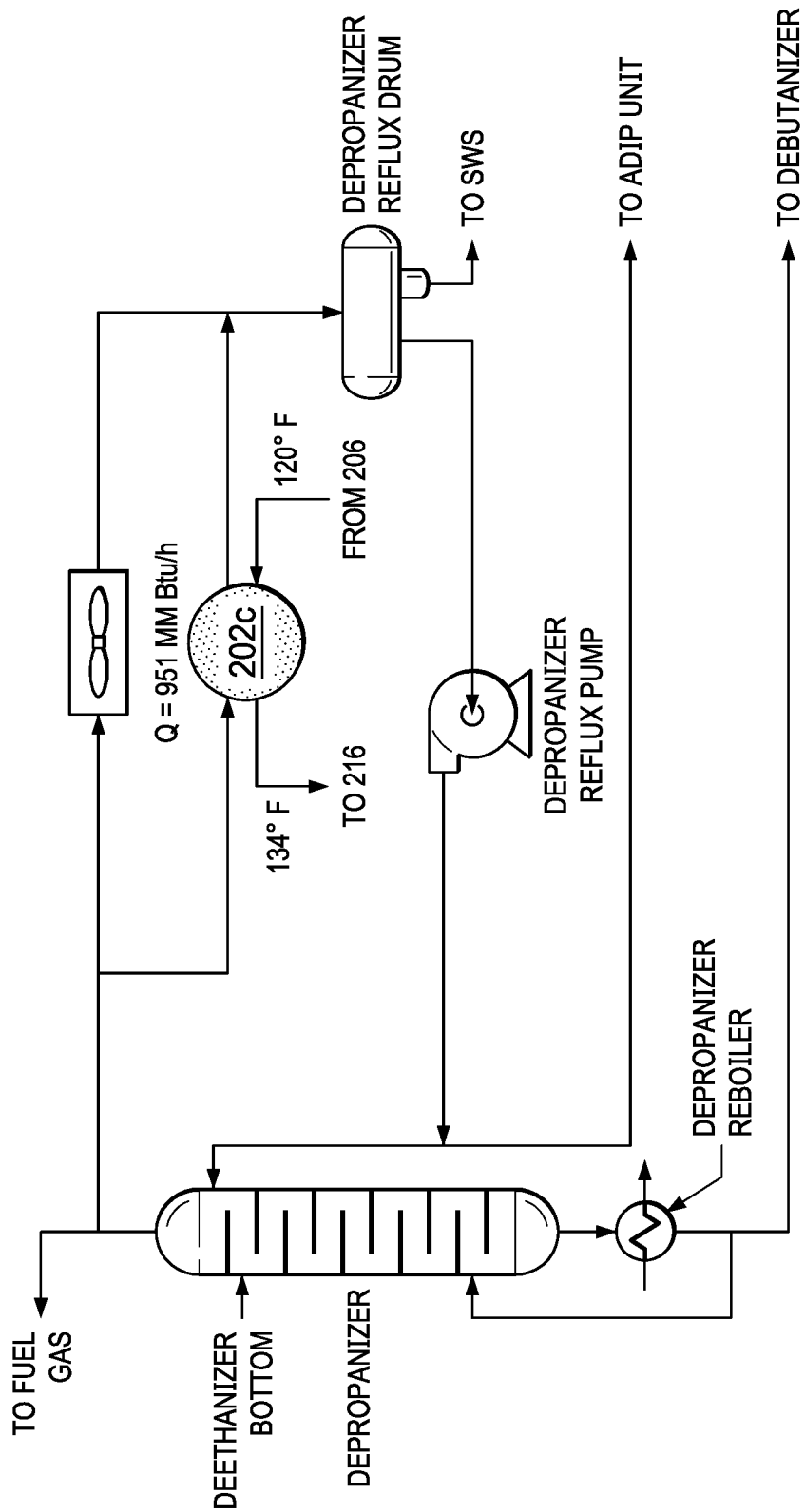
FIG. 1D is a diagram of a depropanizer section waste heat recovery system in a NGL plant.

FIG. 1D shows the third heat exchanger 202c in a depropanizer section of the NGL fractionation plant. In this example, the heat exchanger 202c is positioned and thermally coupled to a heat source to recover waste heat from the depropanizer section. The heating fluid 204 is circulated from the storage tank 206 at 120° F. to heat exchanger 202c to cool down the outlet stream of the depropanizer overhead stream. The heating fluid 204 is heated in the heat exchanger 202c to between about 129° F. and 139° F., for example, about 134° F. before it is circulated to the collection header to join other heating fluid streams from other parts of the NGL fractionation plant to flow to the power generation system 210. The total thermal duty of the heat exchanger 202c is about 951 MM BTU/H.

Figure 1E:
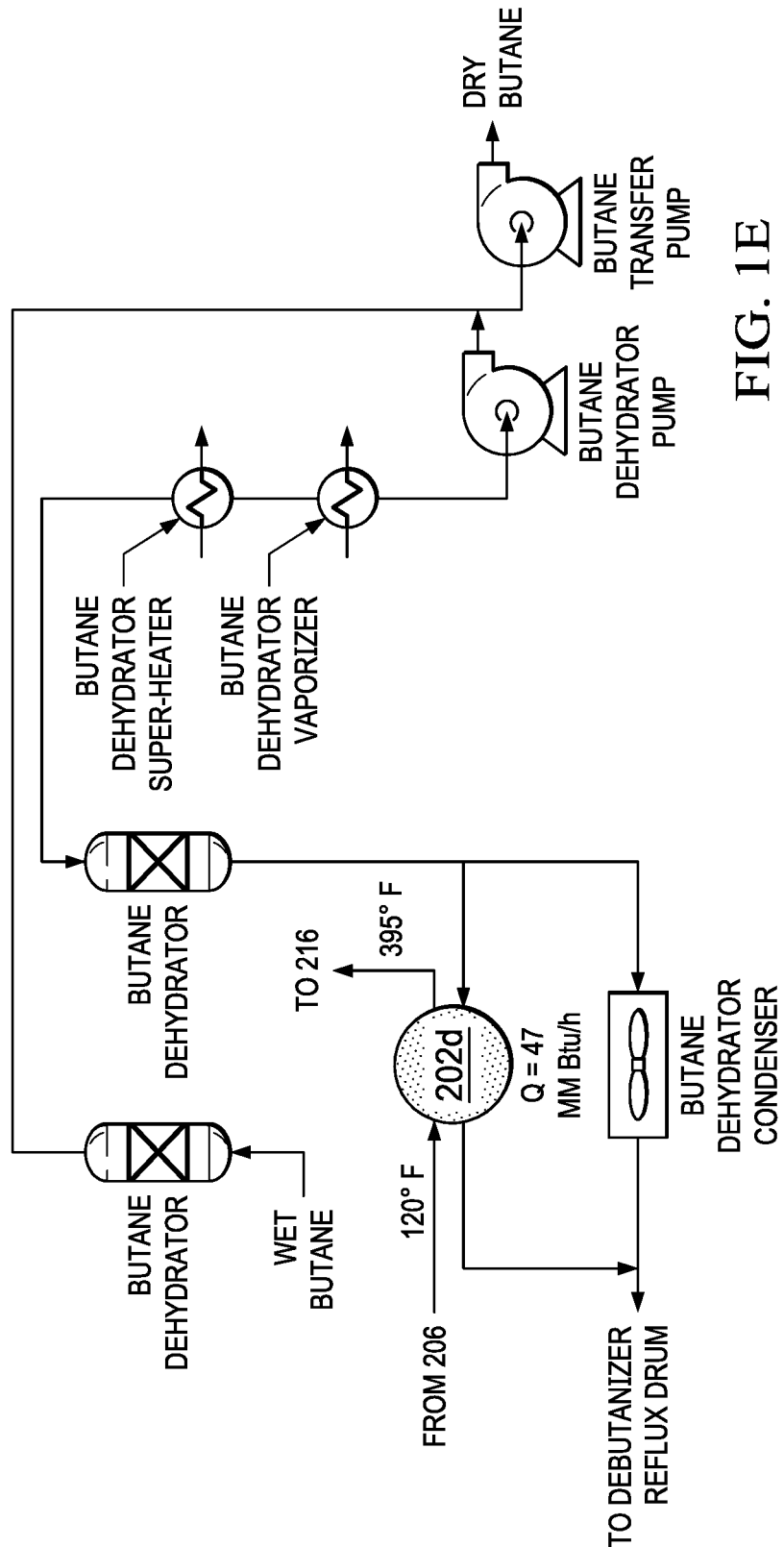
FIG. 1E is a diagram of a butane dehydrator section waste heat recovery system in a NGL plant.

FIG. 1E shows the fourth heat exchanger 202d in a butane dehydrator section of the NGL fractionation plant. In this example, the heat exchanger 202d is positioned and thermally coupled to a heat source to recover waste heat from the butane dehydration section. The heating fluid 204 is circulated from the storage tank 206 at 120° F. to heat exchanger 202d to cool down the outlet stream of the butane dehydrator. The heating fluid 204 is heated in the heat exchanger 202d to between about 390° F. and 400° F., for example, about 395° F. before it is circulated to the collection header to join other heating fluid streams from other parts of the NGL fractionation plant to flow to the power generation system 210. The total thermal duty of the heat exchanger 202d is about 47 MM BTU/H.

Figure 1F:
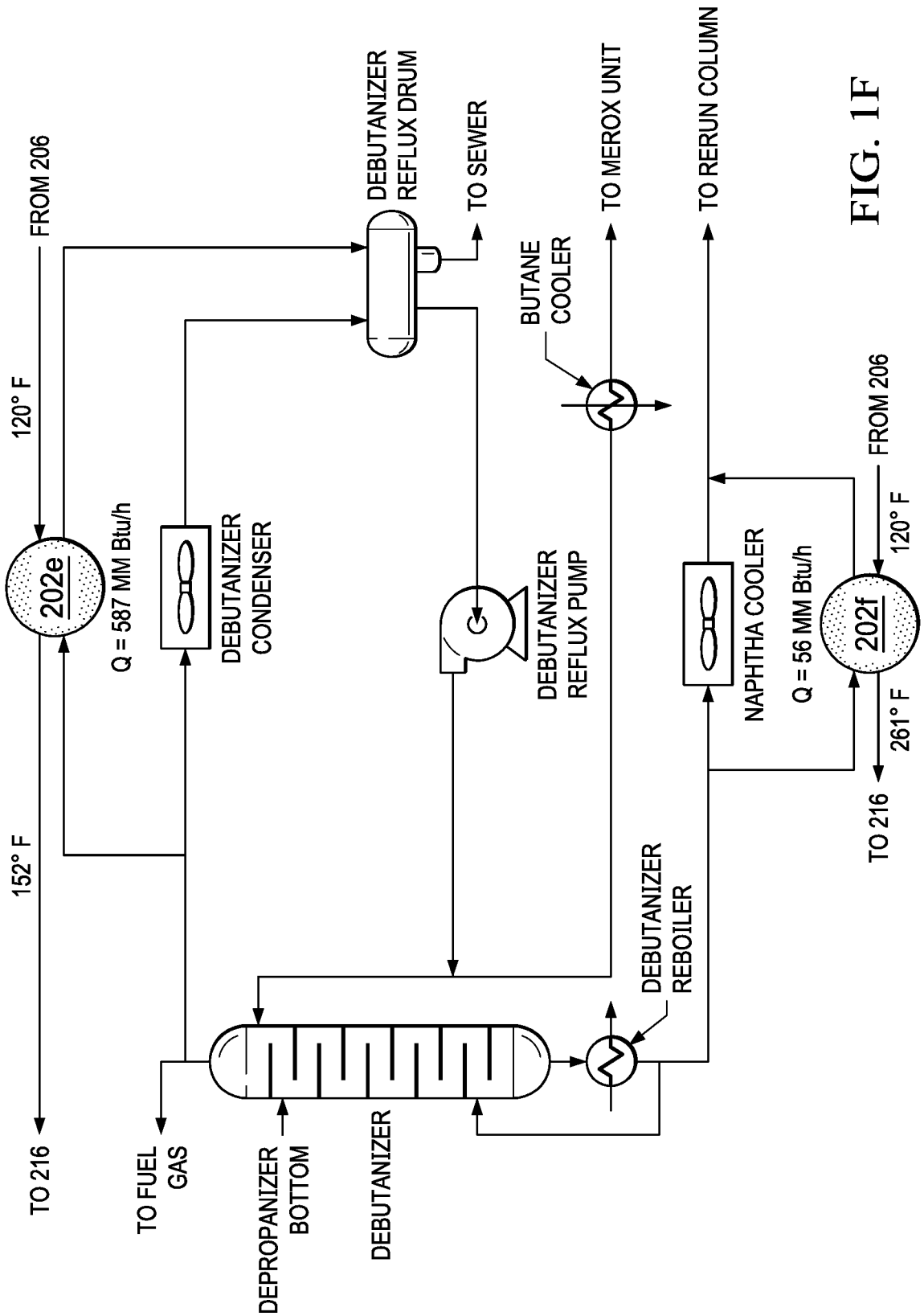
FIG. 1F is a diagram of a debutanizer section waste heat recovery system in a NGL plant.

FIG. 1F shows the fifth heat exchanger 202e and the sixth heat exchanger 202f in a debutanizer section of the NGL fractionation plant. In this example, the heat exchangers 202e and 202f are positioned and thermally coupled to respective heat sources to recover waste heat from the debutanizer section. The heating fluid 204 is circulated from the storage tank 206 at 120° F. to heat exchanger 202e to cool down the outlet stream of the debutanizer overhead stream. The heating fluid 204 is heated in the heat exchanger 202e to between about 147° F. and 157° F., for example, about 152° F. before it is circulated to the collection header to join other heating fluid streams from other parts of the NGL fractionation plant then directed to flow to the power generation system 210. The total thermal duty of the heat exchanger 202e is about 587 MM BTU/H.

Another branch of the heating fluid 204 is circulated from the storage tank 206 at 120° F. to heat exchanger 202f to cool down the outlet stream of the debutanizer bottoms. The heating fluid 204 is heated in the heat exchanger 202f to between about 256° F. and 266° F., for example, about 261° F. before it is circulated to the collection header to join the other heating fluid streams from other parts of the NGL fractionation plant then directed to flow to the power generation system 210. The total thermal duty of the heat exchanger 202f is about 56 MM BTU/H.

Figure 1G:
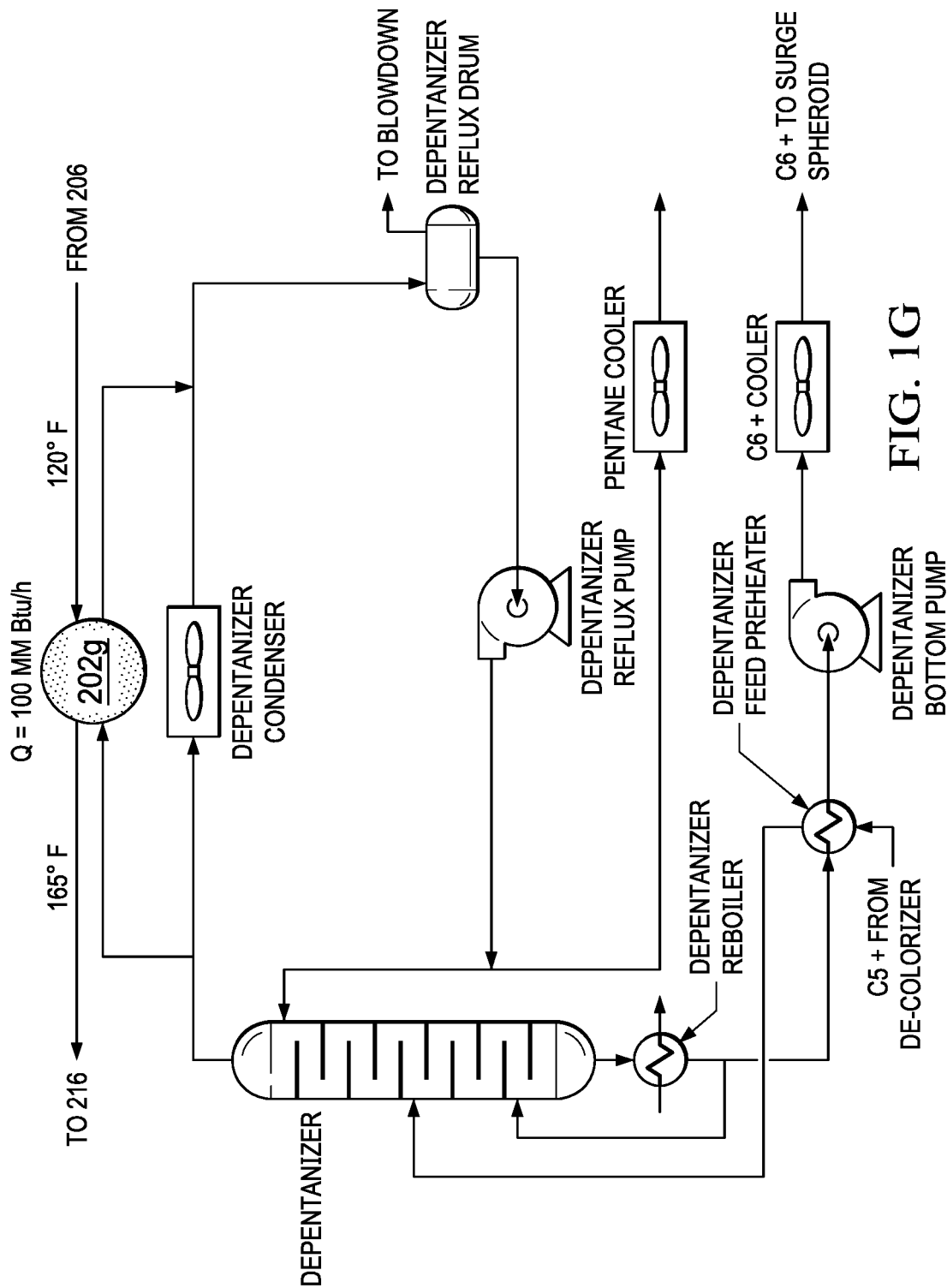
FIG. 1G is a diagram of a depentanizer section waste heat recovery system in a NGL plant.

FIG. 1G shows the seventh heat exchanger 202g in a depentanizer section of the NGL fractionation plant. In this example, the heat exchanger 202g is positioned and thermally coupled to a heat source to recover waste heat from the depentanizer section. The heating fluid 204 branch is circulated from the storage tank 206 at 120° F., to heat exchanger 202g to cool down the outlet stream of the depentanizer overhead stream. The heating fluid 204 is heated in the heat exchanger 202g to between about 160° F. and 170° F., for example, about 165° F. before it is circulated to the collection header to join other heating fluid streams from other parts of the NGL fractionation plant then directed to flow to the power generation system 210. The total thermal duty of the heat exchanger 202g is about 200 MM BTU/H.

Figure 1H:
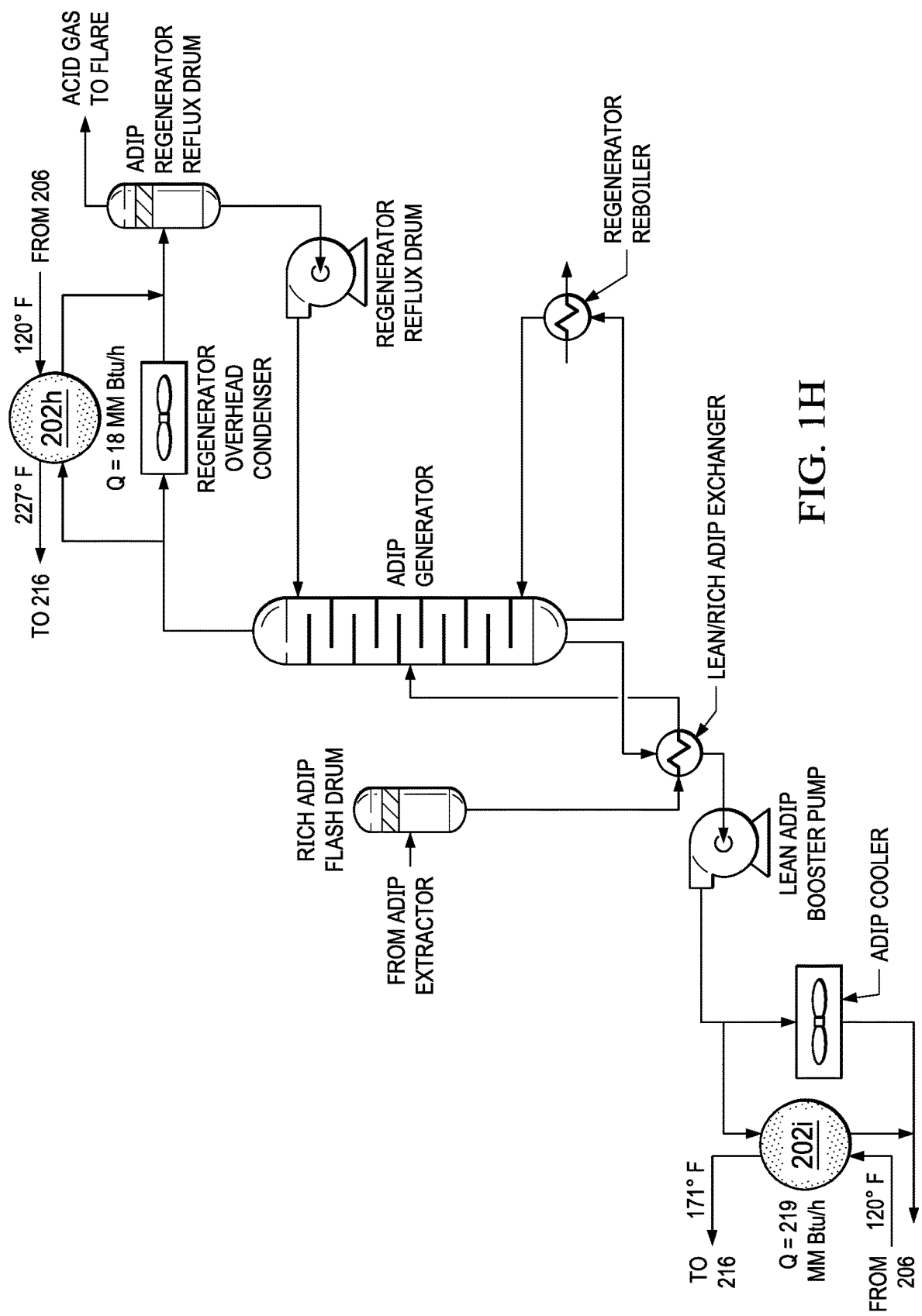
FIG. 1H is a diagram of a solvent regeneration section waste heat recovery system in a NGL plant.

FIG. 1H shows the eighth heat exchanger 202h and the ninth heat exchanger 202i in a solvent regeneration section of the NGL fractionation plant. In this example, the heat exchangers 202h and 202i are positioned and thermally coupled to respective heat sources to recover waste heat from the ADIP regeneration section. The heating fluid 204 is circulated from the storage tank 206 at 120° F. to heat exchanger 202h to cool down the outlet stream of the ADIP regeneration section overhead stream. The heating fluid 204 is heated in the heat exchanger 202h to between about 222° F. and 232° F., for example, about 227° F. before it is circulated to the collection header to join other heating fluid streams from other parts of the NGL fractionation plant then directed to flow to the power generation system 210. The total thermal duty of the heat exchanger 202h is about 18 MM BTU/H.

Another branch of the heating fluid 204 is circulated from the storage tank 206 at 120° F., to heat exchanger 202i to cool down the outlet stream of the ADIP regeneration section bottoms. The heating fluid 204 is heated in the heat exchanger 202i to about 171° F. before it is circulated to the collection header to join the other heating fluid streams from other parts of the NGL fractionation plant then directed to flow to the power generation system 210. The total thermal duty of the heat exchanger 202i is about 219 MM BTU/H.

Figure 1I:
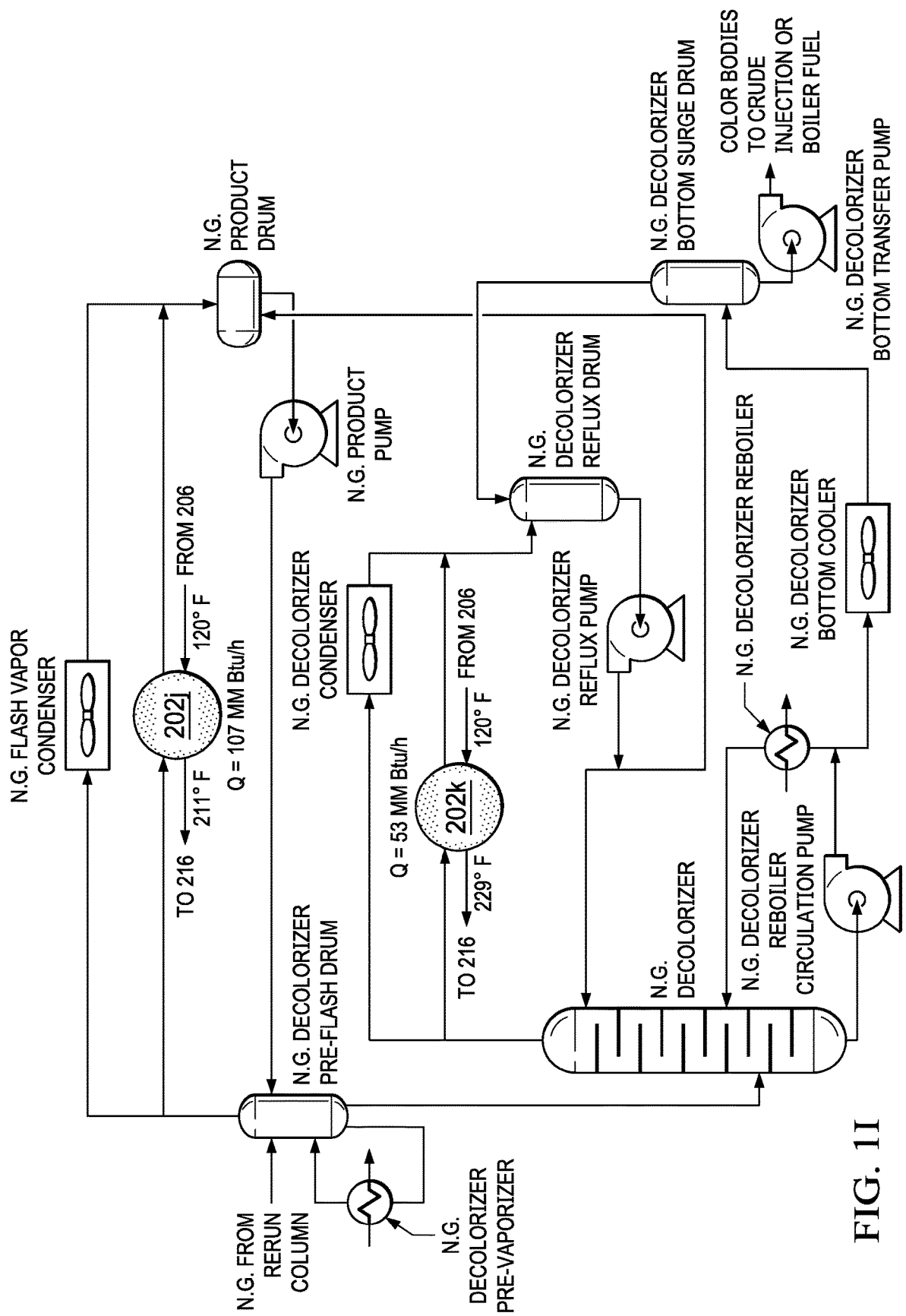
FIG. 1I is a diagram of a natural gasoline decolorizing section waste heat recovery system in a NGL plant.

FIG. 1I shows the tenth heat exchanger 202j and the eleventh heat exchanger 202k in a natural gasoline decolorizing section of the NGL fractionation plant. In this example, the heat exchangers 202j and 202k are positioned and thermally coupled to respective heat sources to recover waste heat from the natural gasoline decolorizing section. The heating fluid 204 is circulated from the storage tank 206 at 120° F. to heat exchanger 202j to cool down the outlet stream of the natural gasoline decolorizing section pre-flash drum overhead stream. The heating fluid 204 is heated in the heat exchanger 202j to between about 206° F. and 216° F., for example, about 211° F. before it is circulated to the collection header to join other heating fluid streams from other parts of the NGL fractionation plant then directed to flow to the power generation system 210. The total thermal duty of the heat exchanger 202j is about 107 MM BTU/H.

Another branch of the heating fluid 204 is circulated from the storage tank 206 at 120° F. to heat exchanger 202k to cool down the outlet stream of the natural gasoline decolorizer overhead stream. The heating fluid 204 is heated in the heat exchanger 202k to between about 224° F. and 234° F., for example, about 229° F. before it is circulated to the collection header to join the other heating fluid streams from other parts of the NGL fractionation plant then directed to flow to the power generation system 210. The total thermal duty of the heat exchanger 202k is about 53 MM BTU/H.

Figure 1J:
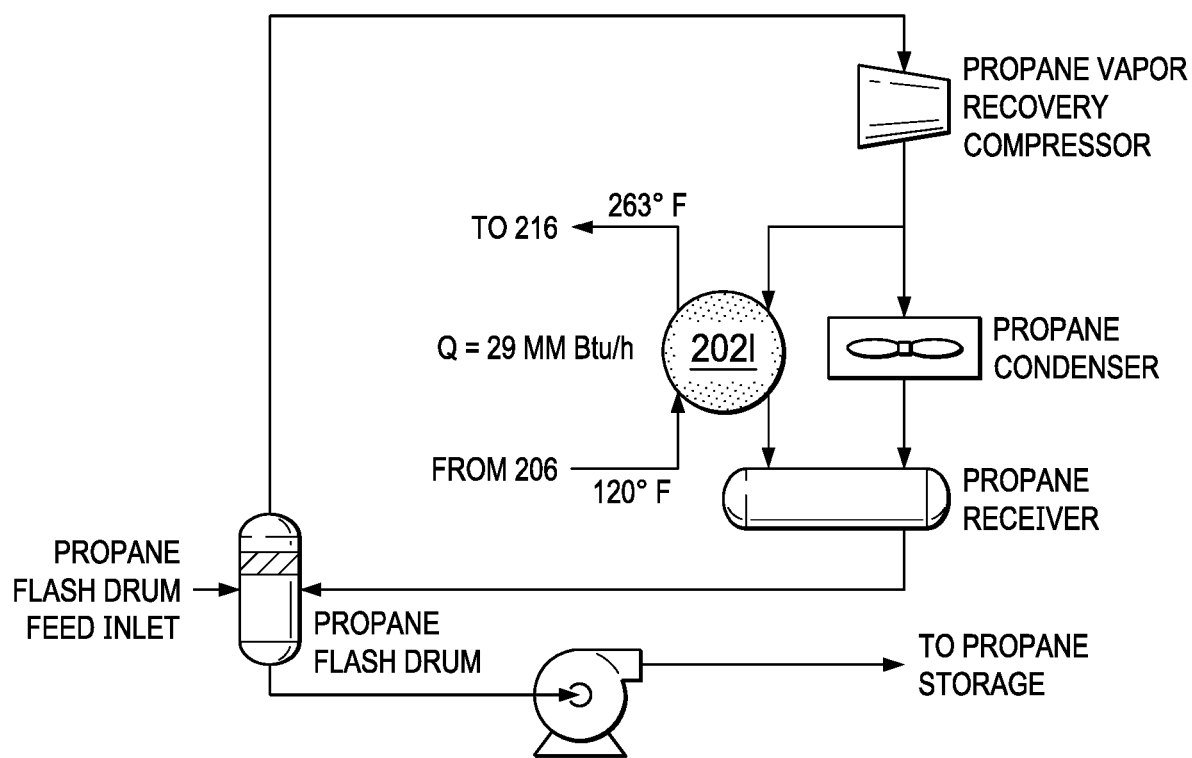
FIG. 1J is a diagram of a propane tank recovery section waste heat recovery system in a NGL plant.

FIG. 1J shows the twelfth heat exchanger 202l in a propane tank recovery section of the NGL fractionation plant. In this example, the heat exchanger 202l is positioned and thermally coupled to a heat source to recover waste heat from the propane tank vapor recovery section. The heating fluid 204 is circulated from the storage tank 206 at 120° F. to heat exchanger 202l to cool down the outlet stream of the propane vapor recovery compressor stream. The heating fluid 204 is heated in the heat exchanger 202l to between about 258° F. and 268° F., for example, about 263° F. before it is circulated to the collection header to join other heating fluid streams from other parts of the NGL fractionation plant then directed to flow to the power generation system 210. The total thermal duty of the heat exchanger 202l is about 29 MM BTU/H.

Figure 1K:
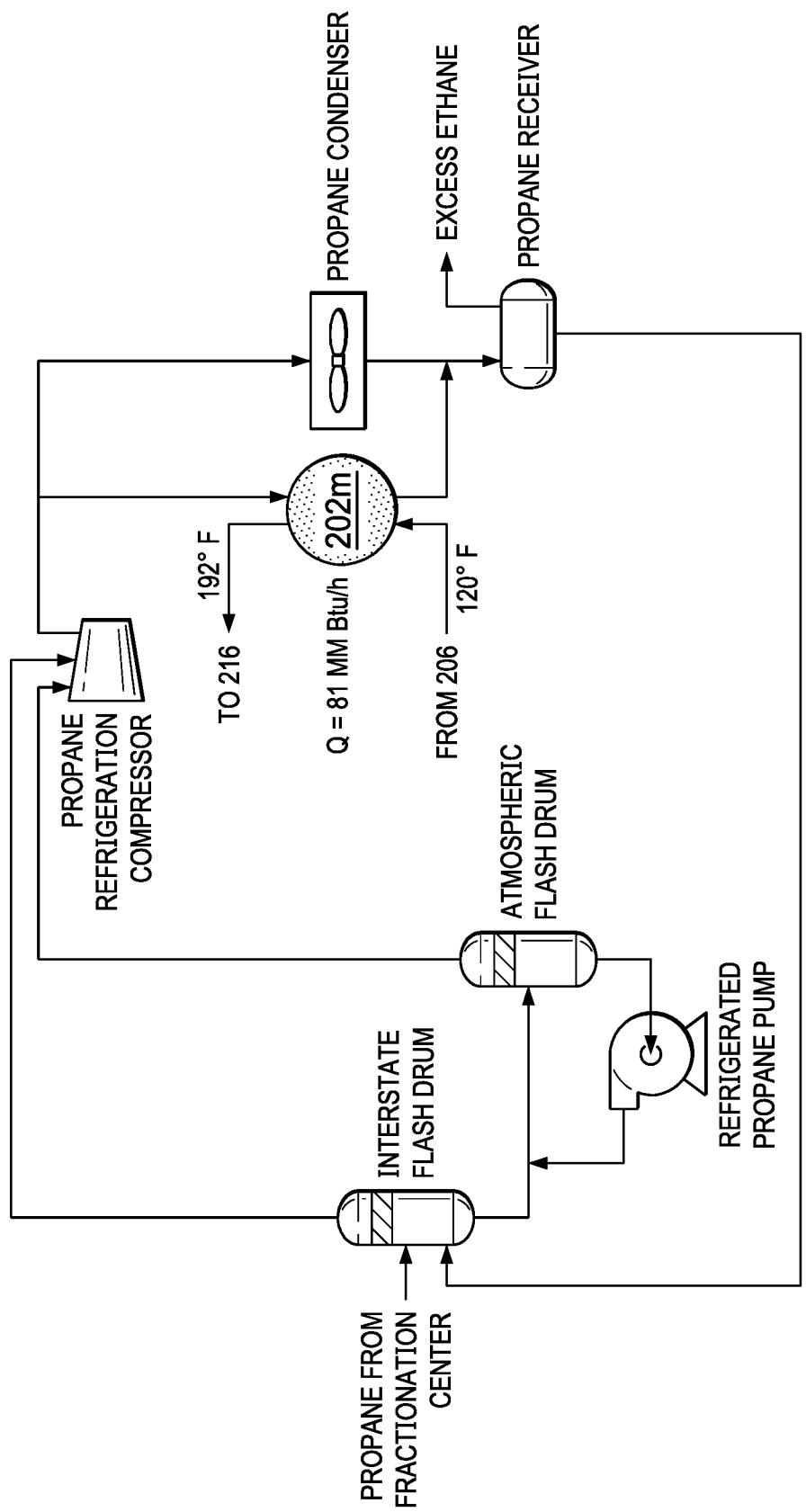
FIG. 1K is a diagram of propane product refrigeration section waste heat recovery system in a NGL plant.

FIG. 1K shows the thirteenth heat exchanger 202m in a propane product refrigeration section of the NGL fractionation plant. In this example, the heat exchanger 202m is positioned and thermally coupled to a heat source to recover waste heat from the propane product refrigeration section. The heating fluid 204 is circulated from the storage tank 206 at 120° F. to heat exchanger 202m to cool down the outlet stream of the propane refrigeration compressor stream. The heating fluid 204 is heated in the heat exchanger 202m to between about 187° F. and 197° F., for example, about 192° F. before it is circulated to the collection header to join other heating fluid streams from other parts of the NGL fractionation plant then directed to flow to the power generation system 210. The total thermal duty of the heat exchanger 202m is about 81 MM BTU/H.

Figure 1L:
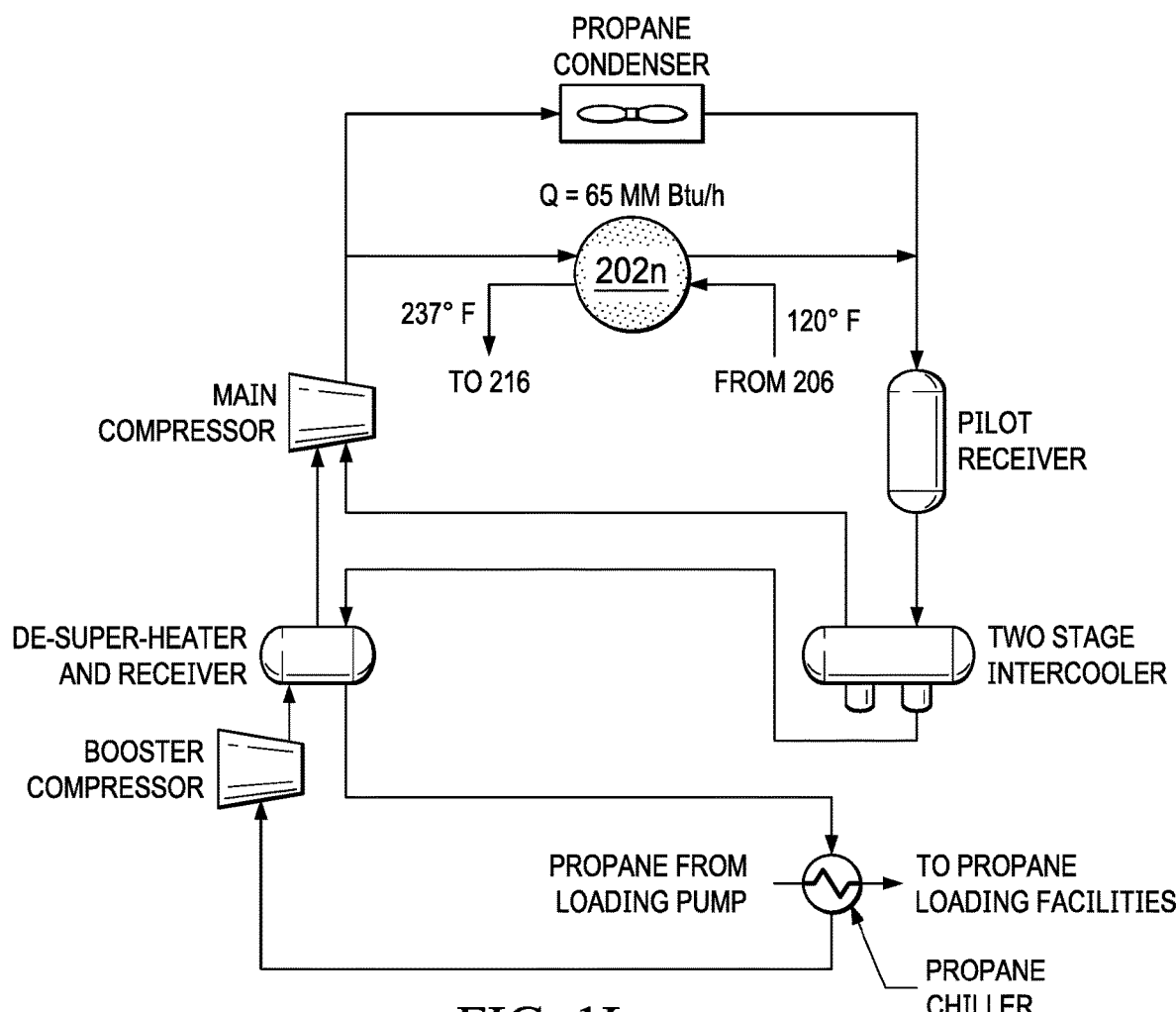
FIG. 1L is a diagram of propane product sub-cooling section waste heat recovery system in a NGL plant.

FIG. 1L shows the fourteenth heat exchanger 202n in a propane product sub-cooling section of the NGL fractionation plant. In this example, the heat exchanger 202n is positioned and thermally coupled to a heat source to recover waste heat from the propane product sub-cooling section. The heating fluid 204 is circulated from the storage tank 206 at 120° F. to heat exchanger 202n to cool down the outlet stream of the propane main compressor stream. The heating fluid 204 is heated to between about 232° F. and 242° F., for example, about 237° F. before it is circulated to the collection header to join other heating fluid streams from other parts of the NGL fractionation plant then directed to flow to the power generation system 210. The total thermal duty of the heat exchanger 202n is about 65 MM BTU/H.

Figure 1M:
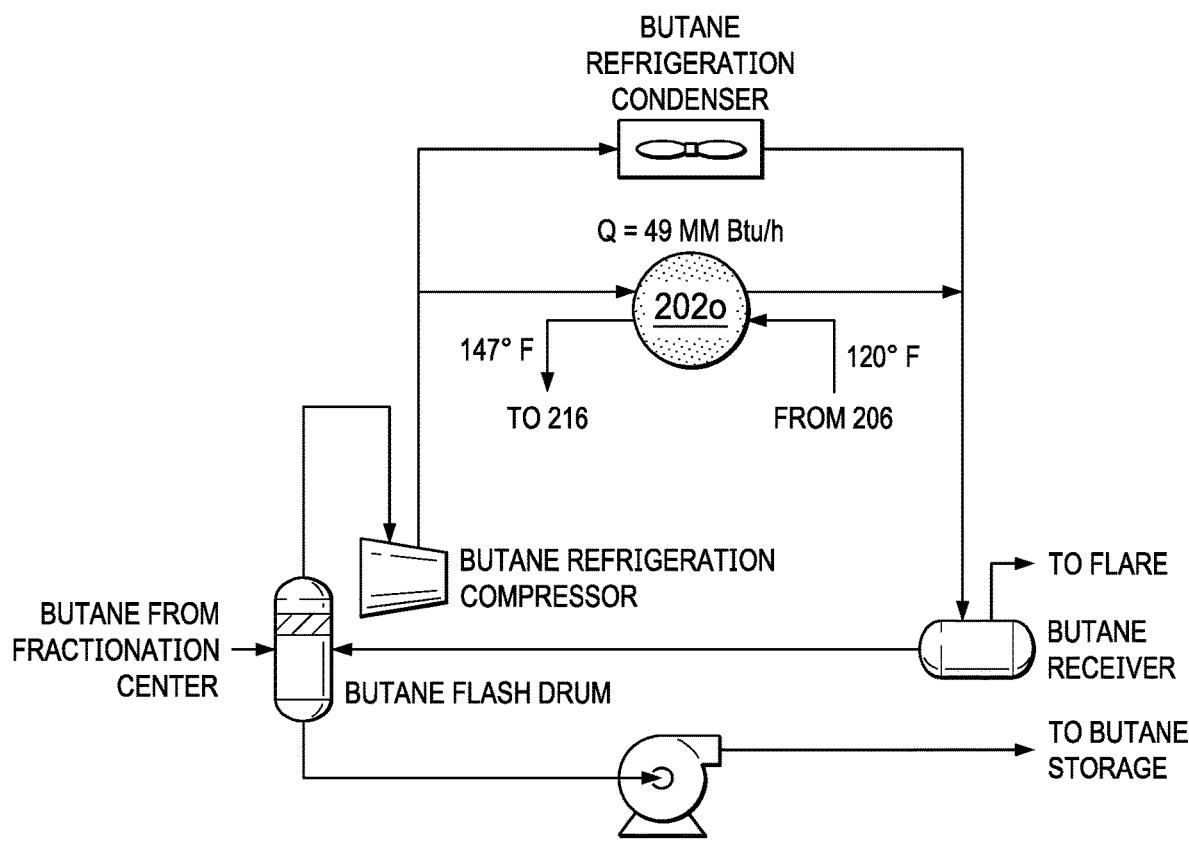
FIG. 1M is a diagram of butane product refrigeration section waste heat recovery system in a NGL plant.

FIG. 1M shows the fifteenth heat exchanger 202o in a butane product refrigeration section of the NGL fractionation plant. In this example, the heat exchanger 202o is positioned and thermally coupled to a heat source to recover waste heat from the butane product refrigeration section. The heating fluid 204 is circulated from the storage tank 206 at 120° F. to heat exchanger 202o to cool down the outlet stream of the butane refrigeration compressor stream. The heating fluid 204 is heated in the heat exchanger 202o to between about 142° F. and 152° F., for example, about 147° F. before it is circulated to the collection header to join other heating fluid streams from other parts of the NGL fractionation plant then directed to flow to the power generation system 210. The total thermal duty of the heat exchanger 202o is about 49 MM BTU/H.

Figure 1N:
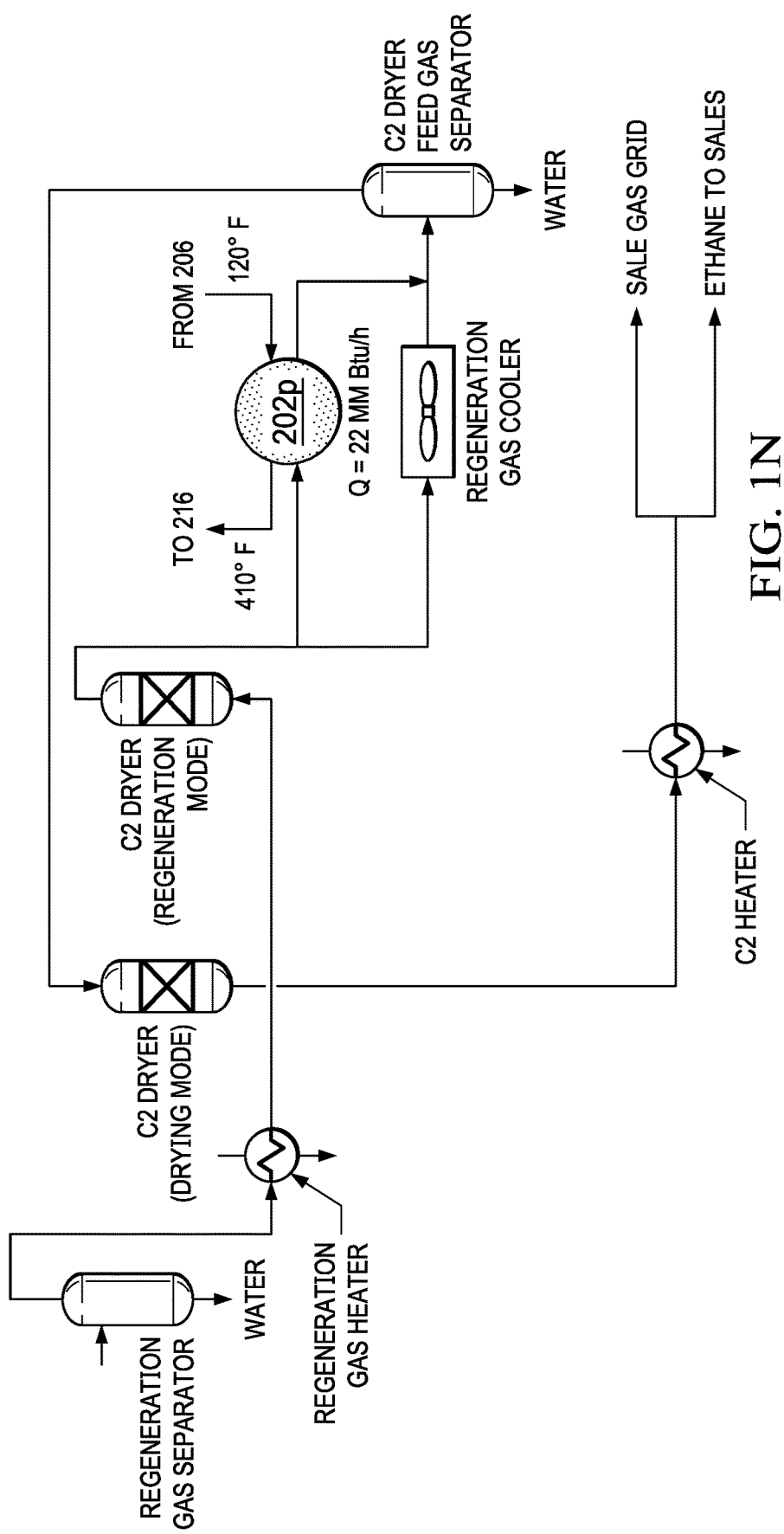
FIG. 1N is a diagram of ethane production section waste heat recovery system in an NGL plant.
Figure 10:
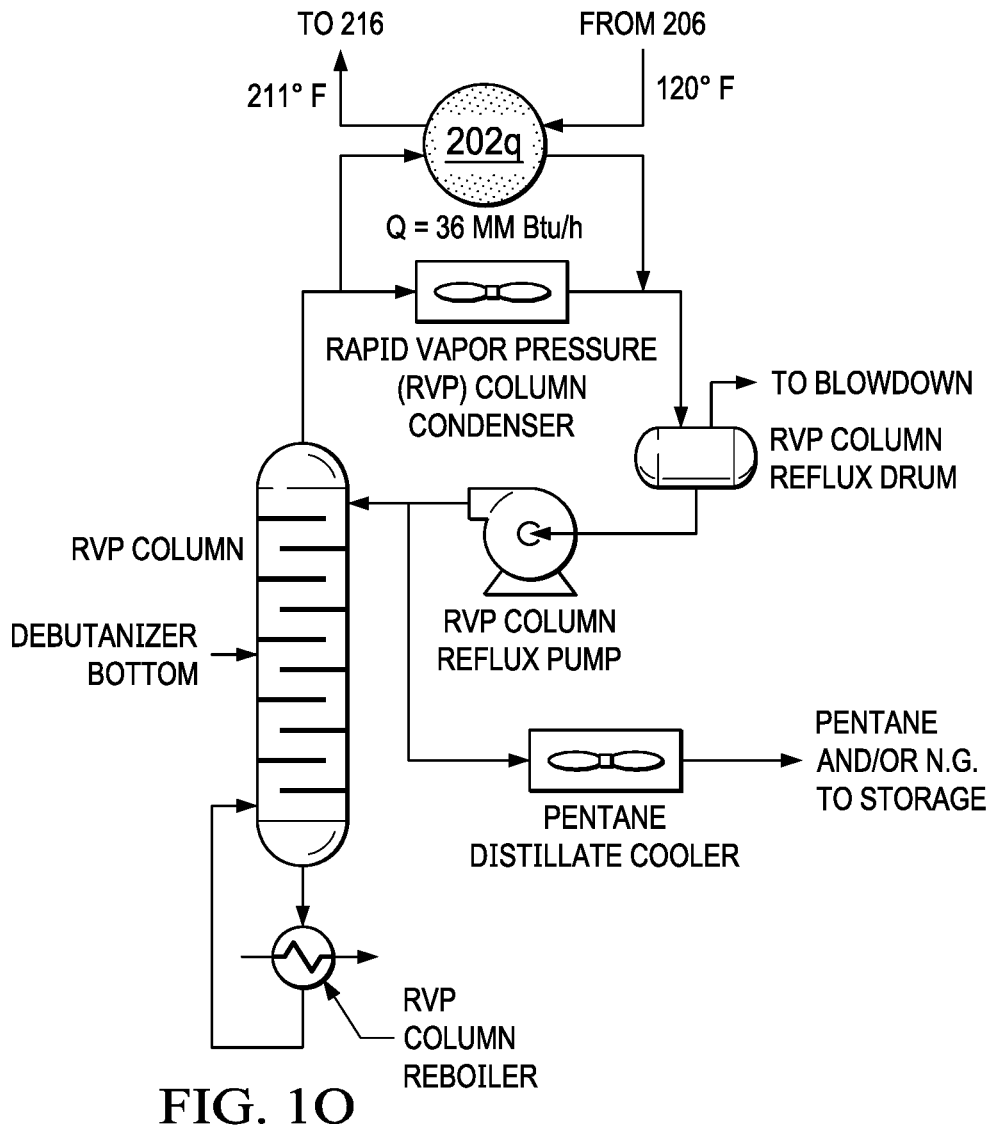

FIG. 1N shows the sixteenth heat exchanger 202p in an ethane production section of the NGL fractionation plant. In this example, the heat exchanger 202p is positioned and thermally coupled to a heat source to recover waste heat from the ethane production section. The heating fluid 204 is circulated from the storage tank 206 at 120° F. to heat exchanger 202p to cool down the outlet stream of the ethane dryer during the generation mode. The heating fluid 204 is heated in the heat exchanger 202p to between about 405° F. and 415° F., for example, about 410° F. before it is circulated to the collection header to join other heating fluid streams from other parts of the NGL fractionation plant then directed to flow to the power generation system 210. The total thermal duty of the heat exchanger 202p is about 22 MM BTU/H.

FIG. 1O shows the seventeenth heat exchanger 202q in a natural gasoline vapor section of the NGL fractionation plant. In this example, the heat exchanger 202q is positioned and thermally coupled to a heat source to recover waste heat from the natural gasoline vapor pressure control section. The heating fluid 204 is circulated from the storage tank 206 at 120° F. to heat exchanger 202q to cool down the outlet stream of the Reid vapor pressure control column overhead stream. The heating fluid 204 is heated in the heat exchanger 202q to between about 206° F. and 216° F., for example, about 211° F. before it is circulated to the collection header to join other heating fluid streams from other parts of the NGL fractionation plant then directed to flow to the power generation system 210. The total thermal duty of the heat exchanger 202q is about 36 MM BTU/H.

FIG. 1A-1O illustrate schematic views of an example system 200 for a power conversion network that includes waste heat sources associated with a NGL fractionation plant. In this example system 200, a mini-power plant synthesis uses an independent heating circuit of power generation system 210, sharing hot water (or other heating fluid) and isobutane systems infrastructure, to generate power from specific portions of NGL fractionation plant low-low grade waste heat sources. In some aspects, the system 200 can be implemented in one or more steps, where each phase can be separately implemented without hindering future steps to implement the system 200. In some aspects, a minimum approach temperature across a heat exchanger used to transfer heat from a heat source to a working fluid (for example, water) can be as low as 3° C. or may be higher. Higher minimum approach temperatures can be used in the beginning of the phases at the expense of less waste heat recovery and power generation, while reasonable power generation economics of scale designs are still attractive in the level of tens of megawatts of power generation.

In some aspects of system 200, optimized efficiency is realized upon using a minimum approach temperature recommended for the specific heat source streams used in the system design. In such example situations, optimized power generation can be realized without re-changing the initial topology or the sub-set of low grade waste heat streams selected/utilized from the NGL fractionation plant utilized in an initial phase. System 200 and its related process scheme can be implemented for safety and operability through an ORC system using a buffer stream such as hot oil or high pressure hot water systems or a mix of specified connections among buffer systems. The low-low grade waste-heat-to-power-conversion (for example, less than the low grade waste heat temperature defined by U.S. Department of Energy DOE as 232° C.) may be implemented using the ORC systems using isobutane as an organic fluid at specific operating conditions.

The techniques to recover heat energy generated by the NGL fractionation plant described previously can be implemented in at least one or both of two example scenarios. In the first scenario, the techniques can be implemented in an NGL fractionation plant that is to be constructed. For example, a geographic layout to arrange multiple sub-units of an NGL fractionation plant can be identified. The geographic layout can include multiple sub-unit locations at which respective sub-units are to be positioned. Identifying the geographic layout can include actively determining or calculating the location of each sub-unit in the NGL fractionation plant based on particular technical data, for example, a flow of petrochemicals through the sub-units starting from raw natural gas or crude petroleum and resulting in refined natural gas. Identifying the geographic layout can alternatively or in addition include selecting a layout from among multiple previously-generated geographic layouts. A first subset of sub-units of the NGL fractionation plant can be identified. The first subset can include at least two (or more than two) heat-generating sub-units from which heat energy is recoverable to generate electrical power. In the geographic layout, a second subset of the multiple sub-unit locations can be identified. The second subset includes at least two sub-unit locations at which the respective sub-units in the first subset are to be positioned. A power generation system to recover heat energy from the sub-units in the first subset is identified. The power generation system can be substantially similar to the power generation system described earlier. In the geographic layout, a power generation system location can be identified to position the power generation system. At the identified power generation system location, a heat energy recovery efficiency is greater than a heat energy recovery efficiency at other locations in the geographic layout. The NGL fractionation plant planners and constructors can perform modeling and computer-based simulation experiments, or both, to identify an optimal location for the power generation system to maximize heat energy recovery efficiency, for example, by minimizing heat loss when transmitting recovered heat energy from the at least two heat-generating sub-units to the power generation system. The NGL fractionation plant can be constructed according to the geographic layout by positioning the multiple sub-units at the multiple sub-unit locations, positioning the power generation system at the power generation system location, interconnecting the multiple sub-units with each other such that the interconnected multiple sub-units are configured to refine natural gas or crude oil, and interconnecting the power generation system with the sub-units in the first subset such that the power generation system is configured to recover heat energy from the sub-units in the first subset and to provide the recovered heat energy to the power generation system. The power generation system is configured to generate power using the recovered heat energy.

In the second scenario, the techniques can be implemented in an operational NGL fractionation plant. In other words, the power generation system described earlier can be retrofitted to an already constructed and operational NGL fractionation plant.

The economics of industrial production, the limitations of global energy supply, and the realities of environmental conservation are concerns for all industries. It is believed that the world's environment has been negatively affected by global warming caused, in part, by the release of GHG into the atmosphere. Implementations of the subject matter described here can alleviate some of these concerns, and, in some cases, prevent certain NGL fractionation plants, which are having difficulty in reducing their GHG emissions, from having to shut down. By implementing the techniques described here, specific portions in an NGL fractionation plant or an NGL fractionation plant, as a whole, can be made more efficient and less polluting by carbon-free power generation from specific portions of low grade waste heat sources.

Thus, particular implementations of the subject matter have been described. Other implementations are within the scope of the claims provided in this document.

Thus, particular implementations of the subject matter have been described. Other implementations are within the scope of the following claims.

What is claimed is:
1. A system, comprising:
 a heating fluid circuit thermally coupled to a plurality of heat sources of a natural gas liquid (NGL) fractionation plant, the plurality of heat sources comprising:
  a first portion of sub-units of the NGL fractionation plant that comprises an ethane system,
  a second portion of sub-units of the NGL fractionation plant that comprises a propane system,
  a third portion of sub-units of the NGL fractionation plant that comprises a butane system,
  a fourth portion of sub-units of the NGL fractionation plant that comprises a pentane system,
  a fifth portion of sub-units of the NGL fractionation plant that comprises a natural gasoline system, and
  a sixth portion of sub-units of the NGL fractionation plant that comprises a solvent regeneration system;
 a power generation system that comprises an organic Rankine cycle (ORC), the ORC comprising (i) a working fluid that is thermally coupled to the heating fluid circuit in an evaporator of the ORC to heat the working fluid, and (ii) an expander configured to generate electrical power from the heated working fluid; and
 a flow control system that comprises a set of control valves to selectively thermally couple a heating fluid of the heating fluid circuit to at least a portion of the plurality of heat sources of the NGL fractionation plant.

2. The system of claim 1, wherein the heating fluid circuit comprises a heating fluid tank that is fluidly coupled to the evaporator of the ORC.

3. The system of claim 1, wherein the system further comprises conduits containing the working fluid and the working fluid comprises isobutane.

4. The system of claim 3, wherein the heating fluid circuit further comprises pipes containing water or oil.

5. The system of claim 4, wherein the ORC further comprises:
a condenser fluidly coupled to a condenser fluid source to cool the working fluid; and
a pump to circulate the working fluid through the ORC.

6. The system of claim 1, wherein the heating fluid circuit further comprises pipes containing water or oil.

7. The system of claim 1, wherein the ORC further comprises:
a condenser fluidly coupled to a condenser fluid source to cool the working fluid; and
a pump to circulate the working fluid through the ORC.

8. The system of claim 1, wherein the first portion of sub-units of the NGL fractionation plant comprises at least two ethane system heat sources, comprising:
a first ethane system heat source that comprises a heat exchanger that is thermally coupled to an outlet stream of a deethanizer refrigeration compressor; and
a second ethane system heat source that comprises a heat exchanger that is thermally coupled to an outlet stream of an ethane dryer.

9. The system of claim 1, wherein the second portion of sub-units of the NGL fractionation plant comprises at least five propane system heat sources, comprising:
a first propane system heat source that comprises a heat exchanger that is thermally coupled to an outlet stream of a propane dehydrator;
a second propane system heat source that comprises a heat exchanger that is thermally coupled to an outlet stream of a depropanizer overhead stream;
a third propane system heat source that comprises a heat exchanger that is thermally coupled to an outlet stream of a propane vapor recovery compressor stream;
a fourth propane system heat source that comprises a heat exchanger that is thermally coupled to an outlet stream of a propane refrigeration compressor stream; and
a fifth propane system heat source that comprises a heat exchanger that is thermally coupled to an outlet stream of a propane main compressor stream.

10. The system of claim 1, wherein the third portion of sub-units of the NGL fractionation plant comprises at least four butane system heat sources, comprising:
a first butane system heat source that comprises a heat exchanger that is thermally coupled to an outlet stream of a butane dehydrator;
a second butane system heat source that comprises a heat exchanger that is thermally coupled to an outlet stream of a debutanizer overhead stream;
a third butane system heat source that comprises a heat exchanger that is thermally coupled to an outlet stream of a debutanizer bottoms; and
a fourth butane system heat source that comprises a heat exchanger that is thermally coupled to an outlet stream of a butane refrigeration compressor stream.

11. The system of claim 1, wherein the fourth portion of sub-units of the NGL fractionation plant comprises at least one pentane system heat source, comprising:
a first pentane system heat source that comprises a heat exchanger that is thermally coupled to an outlet stream of a depentanizer overhead stream.

12. The system of claim 1, wherein the fifth portion of sub-units of the NGL fractionation plant comprises at least three natural gasoline system heat sources, comprising:
a first natural gasoline system heat source that comprises a heat exchanger that is thermally coupled to an outlet stream of a natural gasoline decolorizing section pre-flash drum overhead stream; and
a second natural gasoline system heat source that comprises a heat exchanger that is thermally coupled to an outlet stream of a natural gasoline decolorizer overhead stream; and
a third natural gasoline system heat source that comprises a heat exchanger that is thermally coupled to an outlet stream of a Reid vapor pressure control column overhead stream.

13. The system of claim 1, wherein the sixth portion of sub-units of the NGL fractionation plant comprises at least two solvent regeneration system heat sources, comprising:
a first solvent regeneration system heat source that comprises a heat exchanger that is thermally coupled to an outlet stream of an ADIP regeneration section overhead stream; and
a second solvent regeneration system heat source that comprises a heat exchanger that is thermally coupled to an outlet stream of an ADIP regeneration section bottoms.

14. A method of recovering heat energy generated by a natural gas liquid (NGL) fractionation plant, the method comprising:
circulating a heating fluid through a heating fluid circuit thermally coupled to a plurality of heat sources of a natural gas liquid (NGL) fractionation plant, the plurality of heat sources comprising:
a first portion of sub-units of the NGL fractionation plant that comprises an ethane system,
a second portion of sub-units of the NGL fractionation plant that comprises a propane system,
a third portion of sub-units of the NGL fractionation plant that comprises a butane system,
a fourth portion of sub-units of the NGL fractionation plant that comprises a pentane system,
a fifth portion of sub-units of the NGL fractionation plant that comprises a natural gasoline system, and
a sixth portion of sub-units of the NGL fractionation plant that comprises a solvent regeneration system;
generating electrical power through a power generation system that comprises an organic Rankine cycle (ORC), the ORC comprising (i) a working fluid that is thermally coupled to the heating fluid circuit in an evaporator of the ORC to heat the working fluid with the heating fluid, and (ii) an expander configured to generate electrical power from the heated working fluid; and
actuating, with a flow control system, a set of control valves to selectively thermally couple the heating fluid circuit to at least a portion of the plurality of heat sources to heat the heating fluid with the plurality of heat sources.

15. The method of claim 14, wherein the heating fluid circuit comprises a heating fluid tank that is fluidly coupled to the evaporator of the ORC.

16. The method of claim 14, wherein the working fluid comprises isobutane.

17. The method of claim 16, wherein the heating fluid circuit comprises water or oil.

18. The method of claim 17, wherein the ORC further comprises:
a condenser fluidly coupled to a condenser fluid source to cool the working fluid; and
a pump to circulate the working fluid through the ORC.

19. The method of claim 14, wherein the heating fluid comprises water or oil.

20. The method of claim 14, wherein the ORC further comprises:
a condenser fluidly coupled to a condenser fluid source to cool the working fluid; and
a pump to circulate the working fluid through the ORC.

21. The method of claim 14, wherein the first portion of sub-units of the NGL fractionation plant comprises at least two ethane system heat sources, comprising:
a first ethane system heat source that comprises a heat exchanger that is thermally coupled to an outlet stream of a deethanizer refrigeration compressor; and
a second ethane system heat source that comprises a heat exchanger that is thermally coupled to an outlet stream of an ethane dryer.

22. The method of claim 14, wherein the second portion of sub-units of the NGL fractionation plant comprises at least five propane system heat sources, comprising:
a first propane system heat source that comprises a heat exchanger that is thermally coupled to an outlet stream of a propane dehydrator;
a second propane system heat source that comprises a heat exchanger that is thermally coupled to an outlet stream of a depropanizer overhead stream;
a third propane system heat source that comprises a heat exchanger that is thermally coupled to an outlet stream of a propane vapor recovery compressor stream;
a fourth propane system heat source that comprises a heat exchanger that is thermally coupled to an outlet stream of a propane refrigeration compressor stream; and
a fifth propane system heat source that comprises a heat exchanger that is thermally coupled to an outlet stream of a propane main compressor stream.

23. The method of claim 14, wherein the third portion of sub-units of the NGL fractionation plant comprises at least four butane system heat sources, comprising:
a first butane system heat source that comprises a heat exchanger that is thermally coupled to an outlet stream of a butane dehydrator;
a second butane system heat source that comprises a heat exchanger that is thermally coupled to an outlet stream of a debutanizer overhead stream;
a third butane system heat source that comprises a heat exchanger that is thermally coupled to an outlet stream of a debutanizer bottoms; and
a fourth butane system heat source that comprises a heat exchanger that is thermally coupled to an outlet stream of a butane refrigeration compressor stream.

24. The method of claim 14, wherein the fourth portion of sub-units of the NGL fractionation plant comprises at least one pentane system heat source, comprising:
a first pentane system heat source that comprises a heat exchanger that is thermally coupled to an outlet stream of a depentanizer overhead stream.

25. The method of claim 14, wherein the fifth portion of sub-units of the NGL fractionation plant comprises at least three natural gasoline system heat sources, comprising:
a first natural gasoline system heat source that comprises a heat exchanger that is thermally coupled to an outlet stream of a natural gasoline decolorizing section pre-flash drum overhead stream; and
a second natural gasoline system heat source that comprises a heat exchanger that is thermally coupled to an outlet stream of a natural gasoline decolorizer overhead stream; and
a third natural gasoline system heat source that comprises a heat exchanger that is thermally coupled to an outlet stream of a Reid vapor pressure control column overhead stream.

26. The method of claim 14, wherein the sixth portion of sub-units of the NGL fractionation plant comprises at least two solvent regeneration system heat sources, comprising:
a first solvent regeneration system heat source that comprises a heat exchanger that is thermally coupled to an outlet stream of an ADIP regeneration section overhead stream; and
a second solvent regeneration system heat source that comprises a heat exchanger that is thermally coupled to an outlet stream of an ADIP regeneration section bottoms.

* * * * *